US012635674B1

(12) United States Patent

McFetters

(10) Patent No.: US 12,635,674 B1

(45) Date of Patent: May 26, 2026

(54) AUTOMATED MAGNETIC ROTARY AQUARIUM GLASS SCRAPER AND SCRATCH REMOVER

(71) Applicant: Michael D. McFetters, Saint Charles, IL (US)

(72) Inventor: Michael D. McFetters, Saint Charles, IL (US)

( * ) Notice: Subject to any disclaimer, the term of this patent is extended or adjusted under 35 U.S.C. 154(b) by 316 days.

(21) Appl. No.: 18/626,309

(22) Filed: Apr. 3, 2024

Related U.S. Application Data

(60) Provisional application No. 63/456,799, filed on Apr. 3, 2023.

(51) Int. Cl.
  *A01K 63/10* (2017.01)
  *B08B 1/16* (2024.01)
  *B08B 1/36* (2024.01)
(52) U.S. Cl.
  CPC .............. *A01K 63/10* (2017.01); *B08B 1/165* (2024.01); *B08B 1/36* (2024.01)
(58) Field of Classification Search
  CPC ..... A47L 1/02; A47L 1/03; A47L 1/05; A47L 1/09; A47L 1/12; A01K 63/10; B08B 1/36; B08B 1/165
  USPC .......................................................... 15/93.1
  See application file for complete search history.

(56) References Cited

U.S. PATENT DOCUMENTS

| | | | | |
|---|---|---|---|---|
| 2004/0216253 A1* | 11/2004 | Enoch, III | ................ | A47L 1/09 |
| | | | | 15/103 |
| 2007/0251036 A1* | 11/2007 | Remer | ...................... | A47L 1/02 |
| | | | | 15/103 |
| 2015/0289487 A1* | 10/2015 | Kirkham | ................ | A01K 63/10 |
| | | | | 15/246.5 |

\* cited by examiner

*Primary Examiner* — Brian D Keller
*Assistant Examiner* — Alberto Saenz
(74) *Attorney, Agent, or Firm* — Steven Ivy P.C.

(57) ABSTRACT

A device for scraping and removing algae buildup from the inside surface of aquarium glass, and smoothing out scratches on the glass. It comprises two disk subassemblies, the external and the internal. The internal subassembly incorporates magnets and a scraper having multiple blades, designed to function within the internal space of the aquarium, submerged in water or otherwise. The external disk subassembly incorporates a swivel, swivel housing, magnets and operates on the exterior surface of the aquarium. An automatic rotational apparatus, or power drill, directly connected to the swivel, supplies rotational force to the magnets of the external disk subassembly. This rotational force is then transmitted to the magnets of the internal disk subassembly, causing the internal subassembly, along with the scraper housing the blades, to rotate and synchronize with the movement of the external subassembly, resulting in scraping and cleaning of the internal surface of the aquarium glass.

8 Claims, 25 Drawing Sheets

180-210

220

110-170

180-210

220

110-170

110 - 170
EXTERNAL DISK

110 - 170
EXTERNAL DISK

110

120

130

140

150

160

161　162

170

180 - 220
INTERNAL DISK

180

180

200

210

220

181

C    181    C

181

SECTION C-C

180 - 220
INTERNAL DISK

180

190

200

210

220

180 - 220
INTERNAL DISK

180 - 220
INTERNAL DISK

180 - 220
INTERNAL DISK

180 - 220
INTERNAL DISK

AUTOMATED MAGNETIC ROTARY AQUARIUM GLASS SCRAPER AND SCRATCH REMOVER

RELATED PATENT APPLICATION

The present Non-Provisional U.S. Patent Application claims priority under 35 U.S.C. § 119(e) to U.S. Provisional Patent Application No. 63/456,799 tiled MAGNETIC ROTARY DRIVE AQUARIUM GLASS CLEANER AND SCRATCH REMOVER, filed on Apr. 3, 2023, the subject matter of which is incorporated herein by reference.

FIELD OF THE INVENTION

The present invention relates to the general field of pet industry, with focus on design and maintenance of glass aquariums configured for keeping and displaying various aquatic plants and ornamental fish.

BACKGROUND OF THE INVENTION

The aquarium industry has experienced substantial growth in recent years, driven by a rising demand for exotic fish, plants, and other aquatic life. Beyond just fish tanks, it encompasses a wide array of accessories like filtration systems, lighting, and decorations. Currently valued at $13.5 billion globally, the industry is expanding rapidly, with an annual growth rate of 7%. Projections suggest it will reach a value of $21.15 billion by 2027.

Aquariums come in various sizes and complexities, from small tanks for individual fish to elaborate systems used in public aquariums and research facilities. They find placement in residential, commercial, and institutional settings, serving purposes ranging from aesthetics to education. Especially valuable as educational tools for children, they offer firsthand observation of fish behavior and natural habitats.

Despite their benefits, many businesses and individuals opt against installing aquariums due to the demanding maintenance they require. Issues such as water quality, disease, and equipment malfunctions are common concerns. Moreover, algae and grime tend to accumulate on the internal surfaces, typically made of glass, risking scratches if cleaned with abrasive tools. Additionally, the size and elevated positions of many aquariums make accessing these internal surfaces cumbersome and potentially hazardous.

The invention, known as the Automated Magnetic Rotary Aquarium Glass Scraper and Scratch Remover, or simply "scraper," provides a solution to the previously mentioned challenges. This device consists of two disk subassemblies: the internal and the external. The internal subassembly features magnets and a scraper with multiple blades, designed to operate within the aquarium's internal space while submerged in water. The external subassembly includes a swivel, swivel housing, and magnets, operating on the exterior surface of the aquarium.

An automatic rotational mechanism, such as a power drill, is directly connected to the swivel, supplying rotational force to the magnets of the external disk subassembly. This rotational force is then transmitted to the magnets of the internal disk subassembly, causing the internal subassembly, along with the scraper blades, to rotate and synchronize with the movement of the external subassembly. This synchronized rotation effectively removes algae buildup and eliminates minor scratches in the glass.

BRIEF SUMMARY OF THE INVENTION

The following information is intended to be a brief summary of the invention, and as such, said information shall not be used as the means of limiting the scope of the invention:

The present invention discloses an automated, magnetic rotary aquarium glass scraper and scratch remover ("scraper"). This scraper is designed to effectively remove algae buildup from the inside surface of aquarium glass, while also capable of eliminating or smoothing out scratches on the glass surface. The scraper is composed of two primary subassemblies: the external disk subassembly and the internal disk subassembly.

The internal disk subassembly comprises five main components: a cover, internal strut, plurality of internal magnets, internal magnet housing, and scraper. It is designed to function within the internal space of the aquarium, specifically focusing on the inner surface of the glass. The scraper, equipped with multiple blades, exerts pressure against the glass using magnetic force and rotates at different speeds to effectively remove the algae and other debris.

Conversely, the external disk subassembly is engineered to operate on the exterior surface of the aquarium glass. Comprising seven primary components—swivel housing, O-ring, swivel, lid, external strut, multiple external magnets, and magnet housing—the external disk subassembly is directly linked to a power drill (or any other automatic rotational apparatus) via the swivel. The power drill supplies rotational force to the magnets housed within the external magnet housing and interconnected by the external strut. This rotational force is then transmitted to the internal plurality of magnets, causing the internal subassembly (along with the scraper housing the blades) to rotate and synchronize with the movement of the external subassembly.

BRIEF DESCRIPTION OF THE DRAWINGS

The components shown in the drawings are not to scale. In the interest of clarity, some of the components might be shown in a generalized form and could be identified utilizing commercial designations. All components, including its essential features, have been assigned reference numbers that are utilized consistently throughout the descriptive process outlined herein.

the middle figure displays a top view of the lid, emphasizing the lid groove and the plurality of threaded holes for facilitating connection to the swivel housing via machine screws (or other means, ensuring consistent, fixed connectivity); the bottom figure provides a side view of the lid, designed to demonstrate that the lid groove extends along the entire radius of the lid; in accordance with an exemplary embodiment of the present invention.

Figure 10:
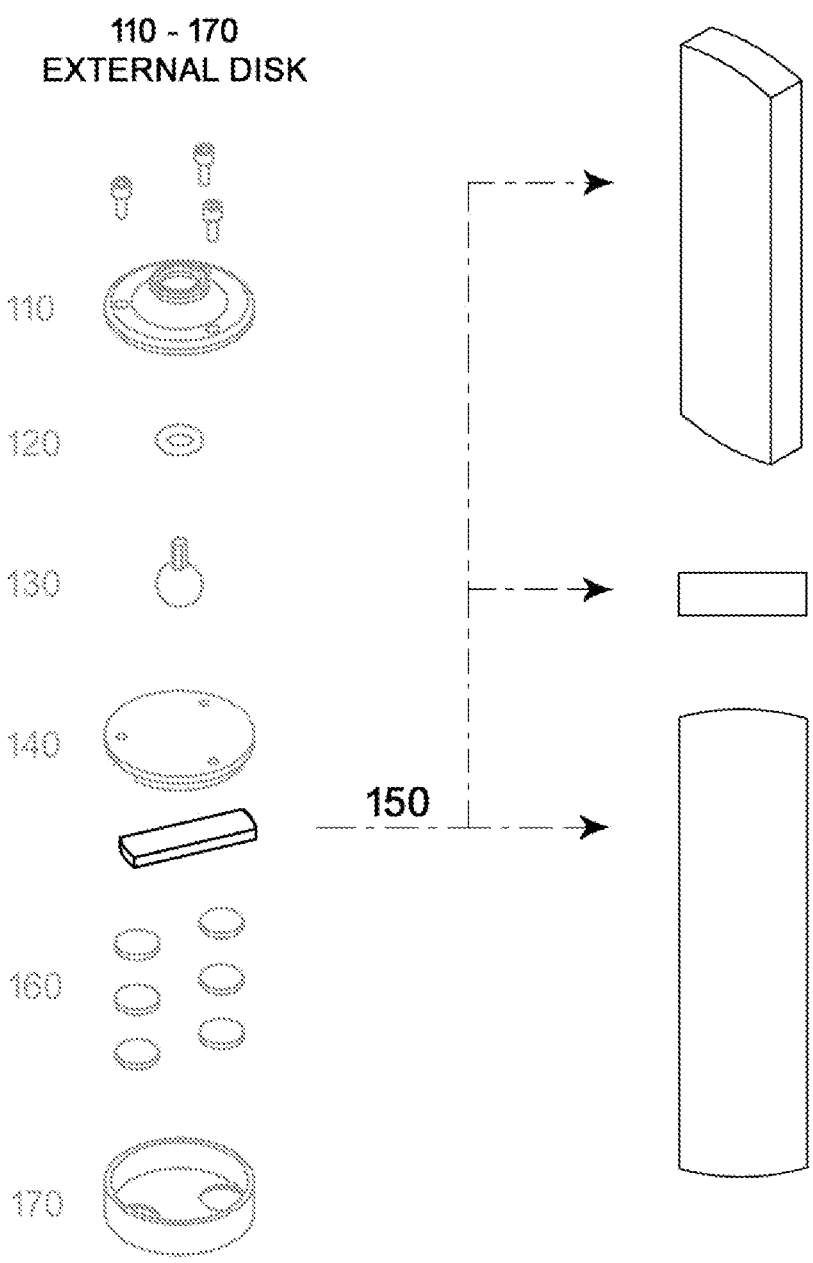

FIG. 10 shows three views of the external strut, a rectangular-shaped component, which serves as the fifth primary component of the external subassembly; the strut functions to connect the magnets by bridging between the first stack of magnets and the second stack of magnets so that any rotation of the strut will result in the rotation of the external magnets housing; the three figures include a perspective view of the external strut at the top, a side view of the external strut in the middle, and a top view of the external strut at the bottom; in accordance with an exemplary embodiment of the present invention.

Figure 11:
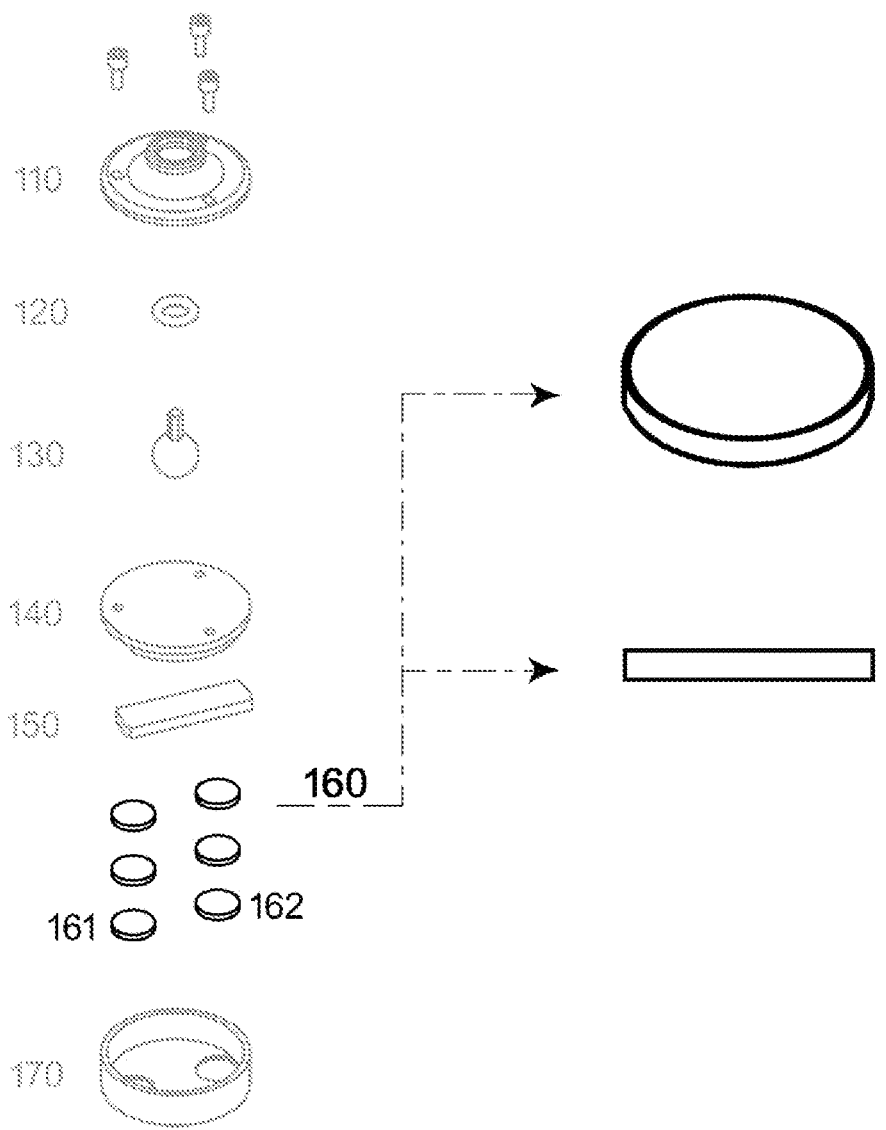

FIG. 11 illustrates a plurality of external magnets, which constitute the sixth component of the external disk subassembly; at the top are two views: a perspective view of a single magnet, and at the bottom, a side view of a single magnet; adjacent to these two figures are six magnets, each displaying two stacks, with three magnets in each stack; one of said stacks is referred to as the external first stack of magnets, while the other stack is denoted as the external second stack of magnets; in accordance with an exemplary embodiment of the present invention.

Figure 12:
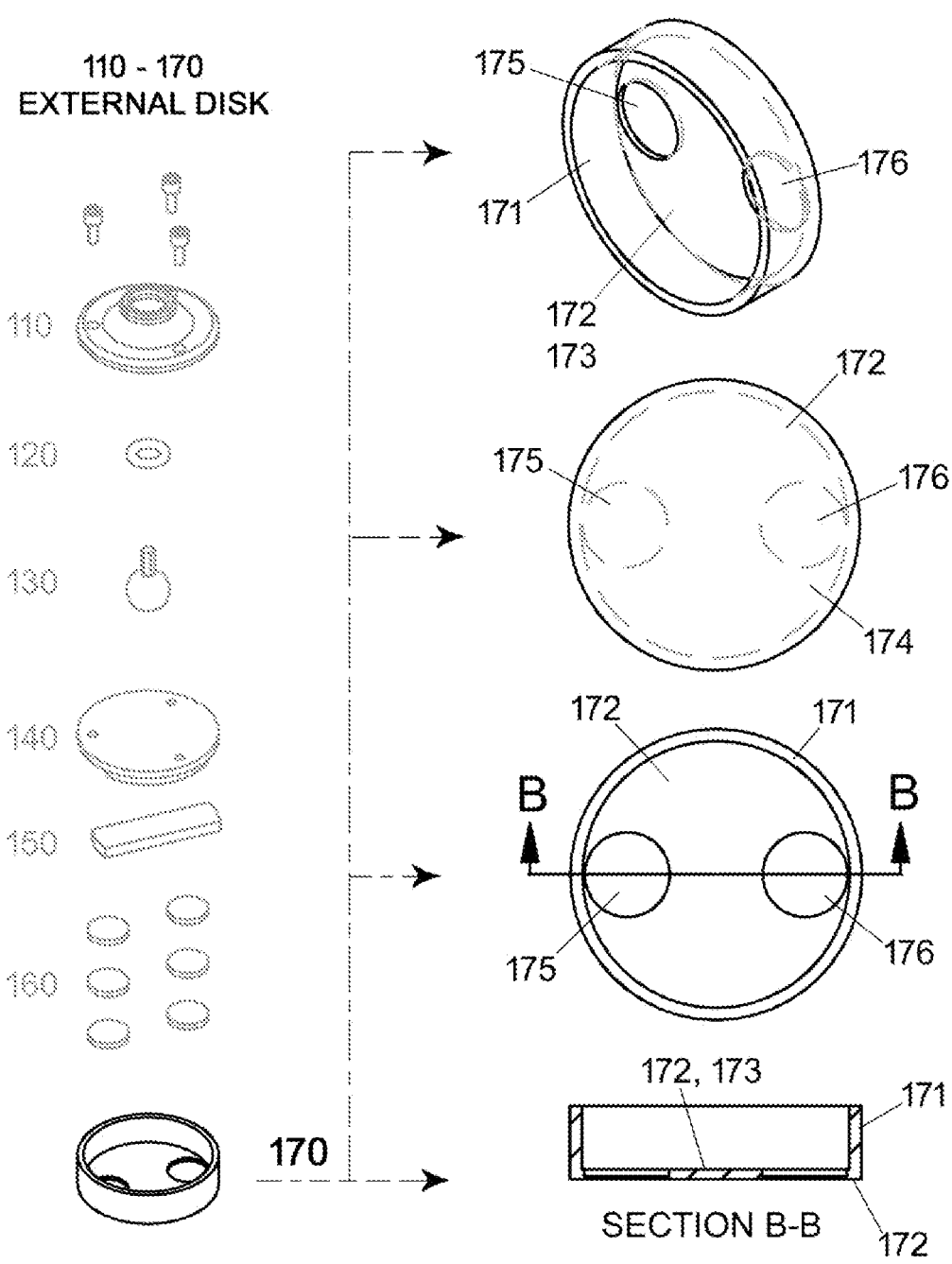

FIG. 12 shows the external magnets housing, serving as the seventh primary component of the external disk subassembly; the figure comprises four views, namely: the top view displays a perspective view of the external magnets housing, while the subsequent figure (directly below) shows the bottom view of the external magnets housing; the third view from the top exhibits a top view of the external magnets housing, highlighting the location of section B-B; and the bottom figure provides a section B-B view of the external magnets housing; additionally, descriptive numbers are utilized to indicate the location of various components of the external magnets housing, including the external magnets housing cylinder (wall), external magnets housing base, external magnets housing base inner surface, external magnets housing base outer surface, first external magnets housing pocket, and second external magnets housing pocket; in accordance with an exemplary embodiment of the present invention.

Figure 13:
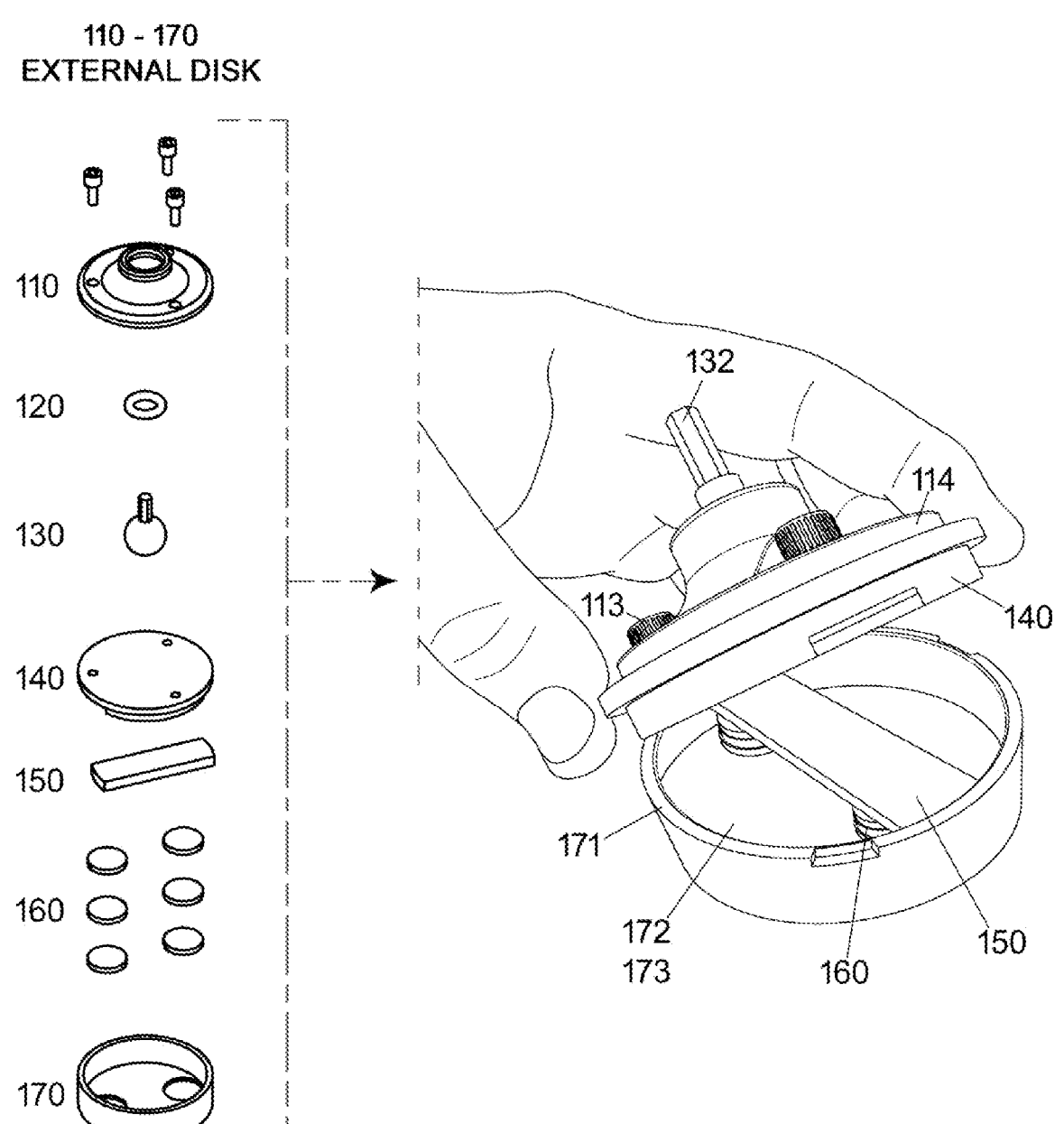

FIG. 13 shows the external disk subassembly, or the top portion of it, comprising of the swivel housing O-ring, swivel, and the lid, being separated form the bottom portion of the external disk subassembly, comprising of the external strut, a plurality of external magnets, and the external magnet housing; in accordance with an exemplary embodiment of the present invention.

Figure 14:
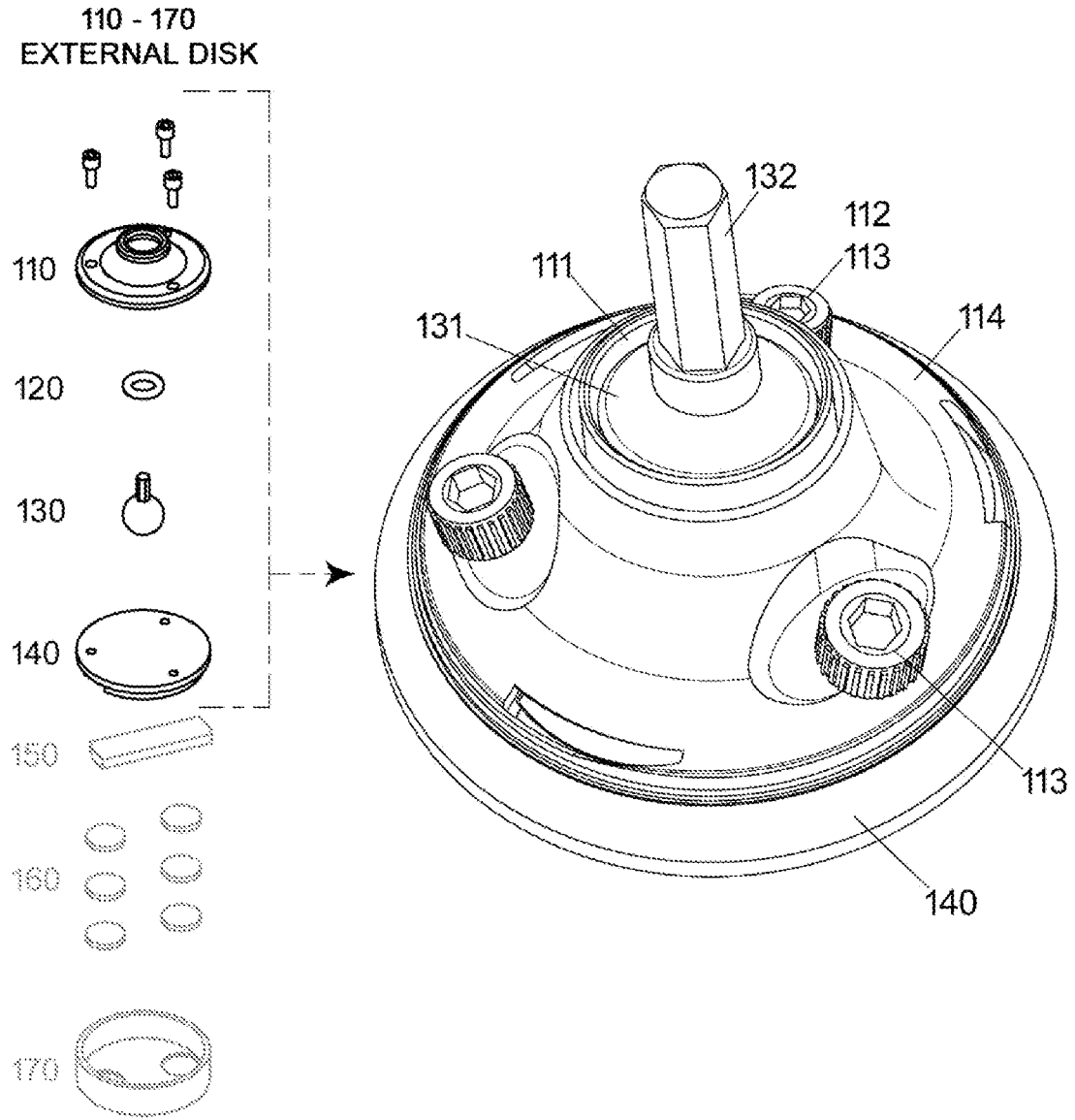

FIG. 14 provides a top perspective view of the external disk subassembly, concentrating on its top portion, which comprises the swivel housing, O-ring, swivel, and lid; additionally, it highlights a plurality of screws positioned within the clearance holes located on the swivel housing base; wherein this view underscores the hexagonal shape of the swivel shaft, which prevents slippage within the chuck of the power drill, which provide the rotation force to the external disk assembly; in accordance with an exemplary embodiment of the present invention.

Figure 15:
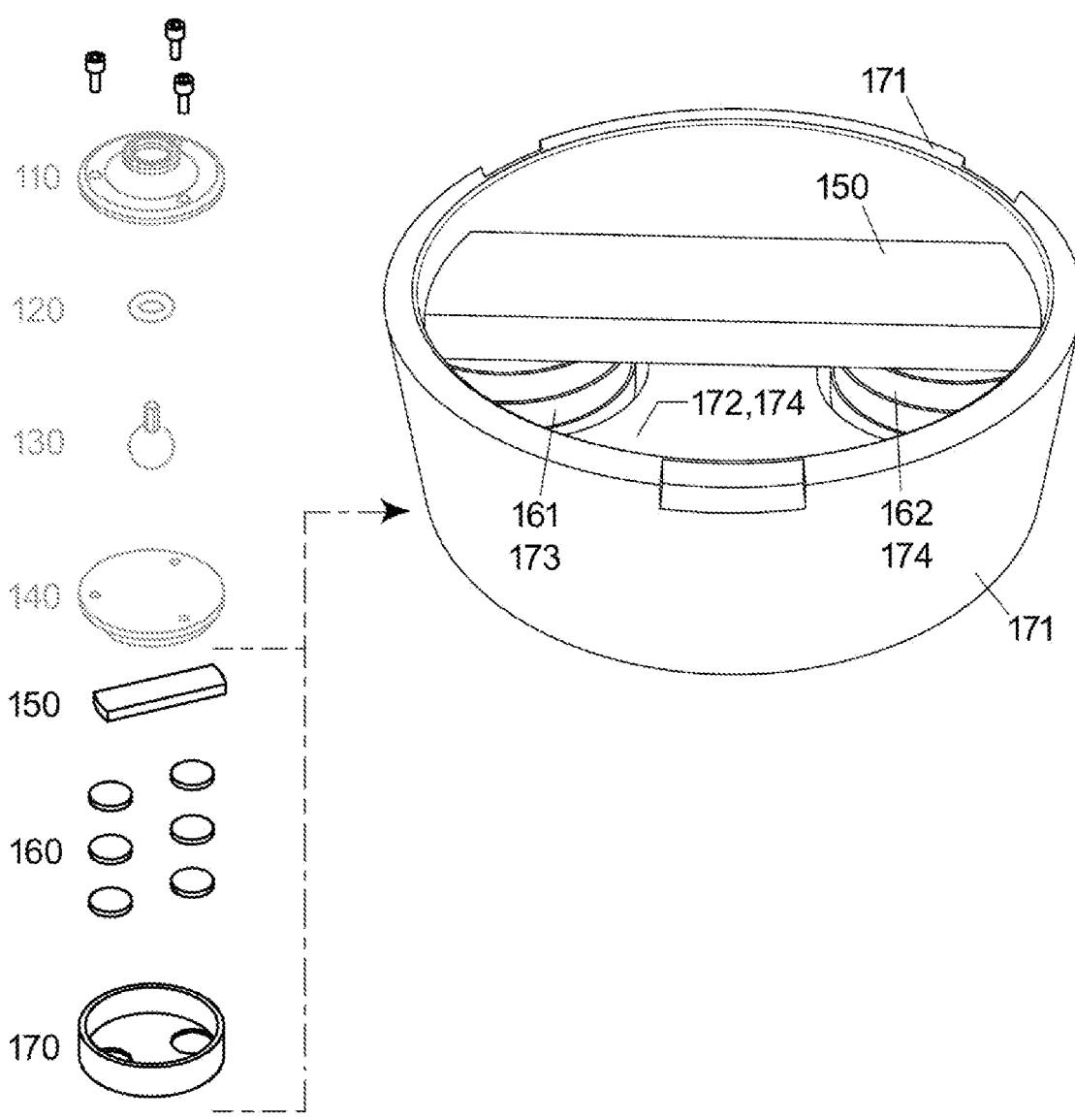

FIG. 15 illustrates the consolidation of the three final primary components of the external disk subassembly into a unified unit; specifically, it displays the external magnets housing holding the plurality of external magnets within it; this configuration reveals the connection between the external first stack of magnets and the external second stack of magnets through the external strut, which is structured to transmit any rotation of the external strut to the external magnet housing; in accordance with an exemplary embodiment of the present invention.

Figure 16:
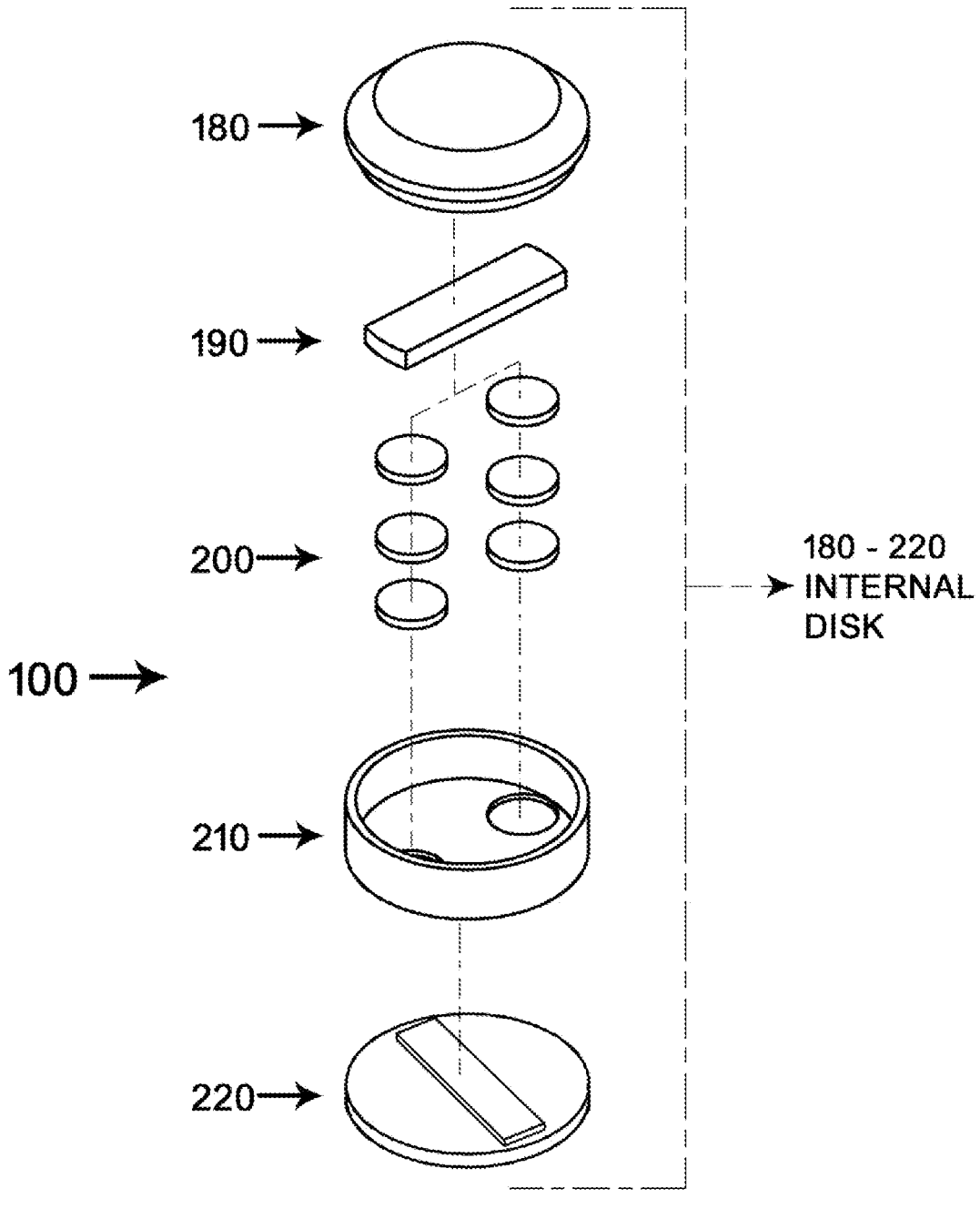

FIG. 16 shows an exploded view of the internal disk subassembly, comprising five primary components: the cover, internal strut, plurality of internal magnets, internal magnet housing, and scraper; in accordance with an exemplary embodiment of the present invention.

Figure 17:
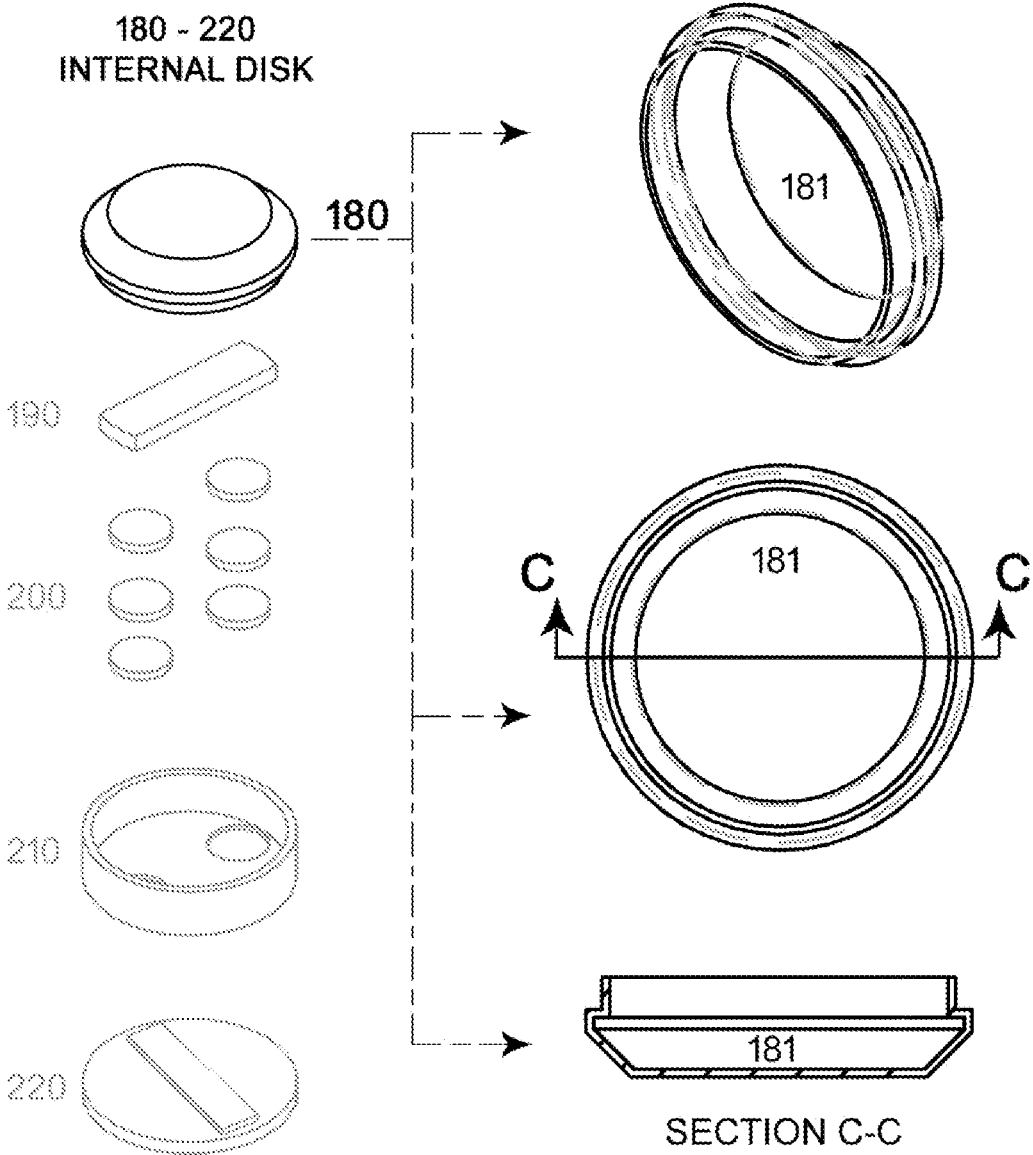

FIG. 17 shows the cover, round-shaped, serving as the initial primary component of the internal disk subassembly; the figure provides three views of the cover, namely: at the top, a perspective view of the cover designed to illustrate the location of the cover cavity; the middle figure provides a top view of the cover, highlighting the positioning of section C-C; and the bottom view is section C-C, reaffirming that the cover features a hollow structure with the cover cavity designed to reduce the item's weight enabling easy rotation generated by the power drill; in accordance with an exemplary embodiment of the present invention.

Figure 18:
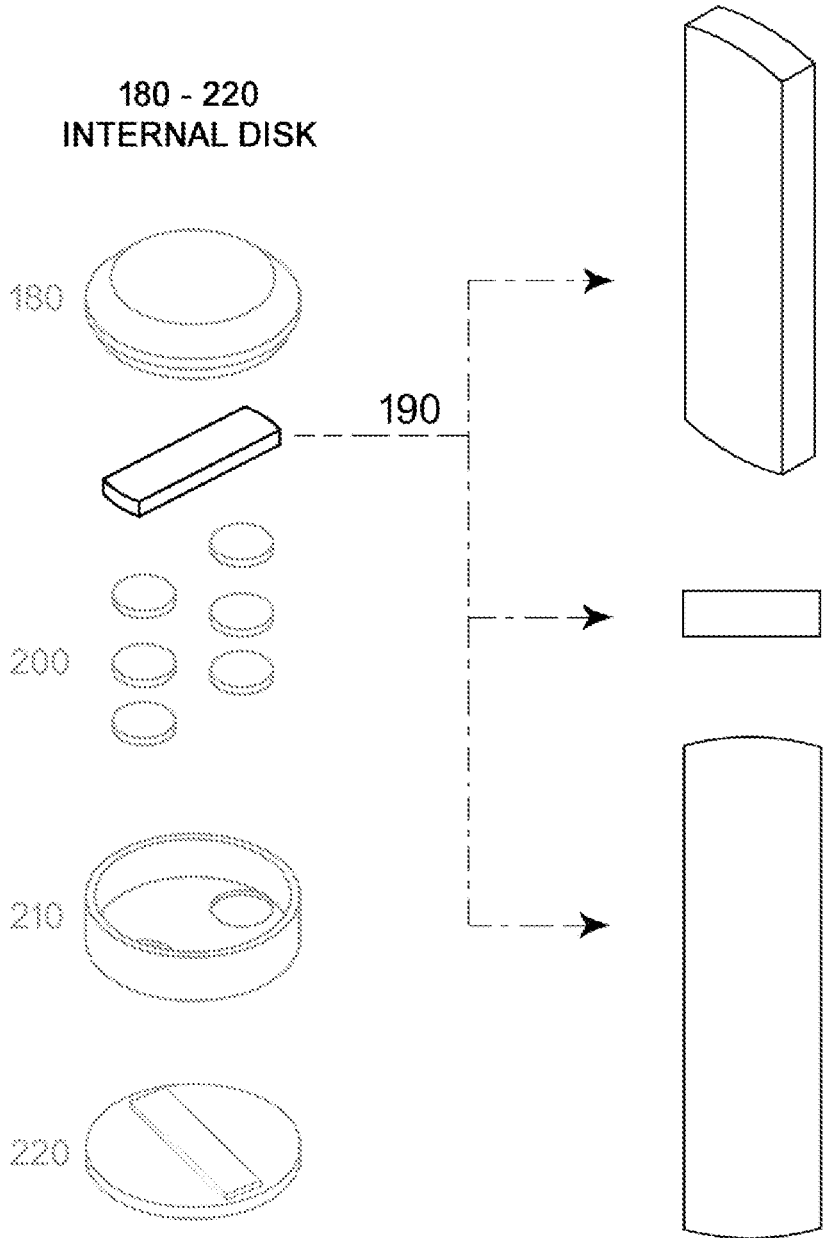

FIG. 18 illustrates the internal strut, serving as the second primary component of the internal disk subassembly; three views of the strut are presented: at the top, a perspective view; in the middle, a side view; and at the bottom, a top view; upon assembly, the strut will be sandwiched between the cover and the plurality of internal magnets; the function of the internal strut is to interconnect the internal first stack of magnets to the internal second stack of magnets; additionally, the internal strut facilitates the transfer of rotation form the power drill to the internal magnet housing; in accordance with an exemplary embodiment of the present invention.

Figure 19:
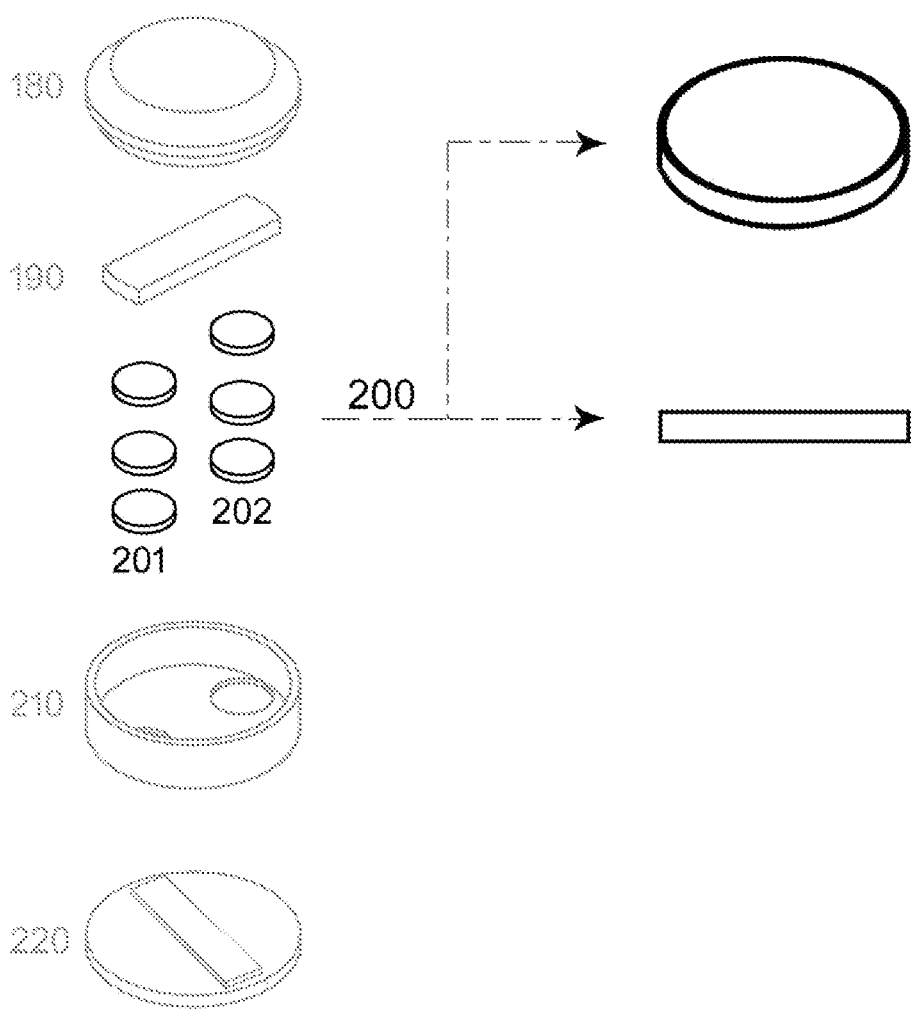

FIG. 19 shows a perspective view of a single magnet, along with its side view; the figure further illustrates (see side drawing identified at 180-22—Internal Disk) that the plurality of internal magnets will be organized into two stacks, each consisting of three magnets; the two stocks are referred to as the internal first stack of magnets, and the internal second stack of magnets; the magnets will be interconnected by the internal strut to facilitate the transfer of any rotation of the internal strut to the internal magnet housing; in accordance with an exemplary embodiment of the present invention.

Figure 20:
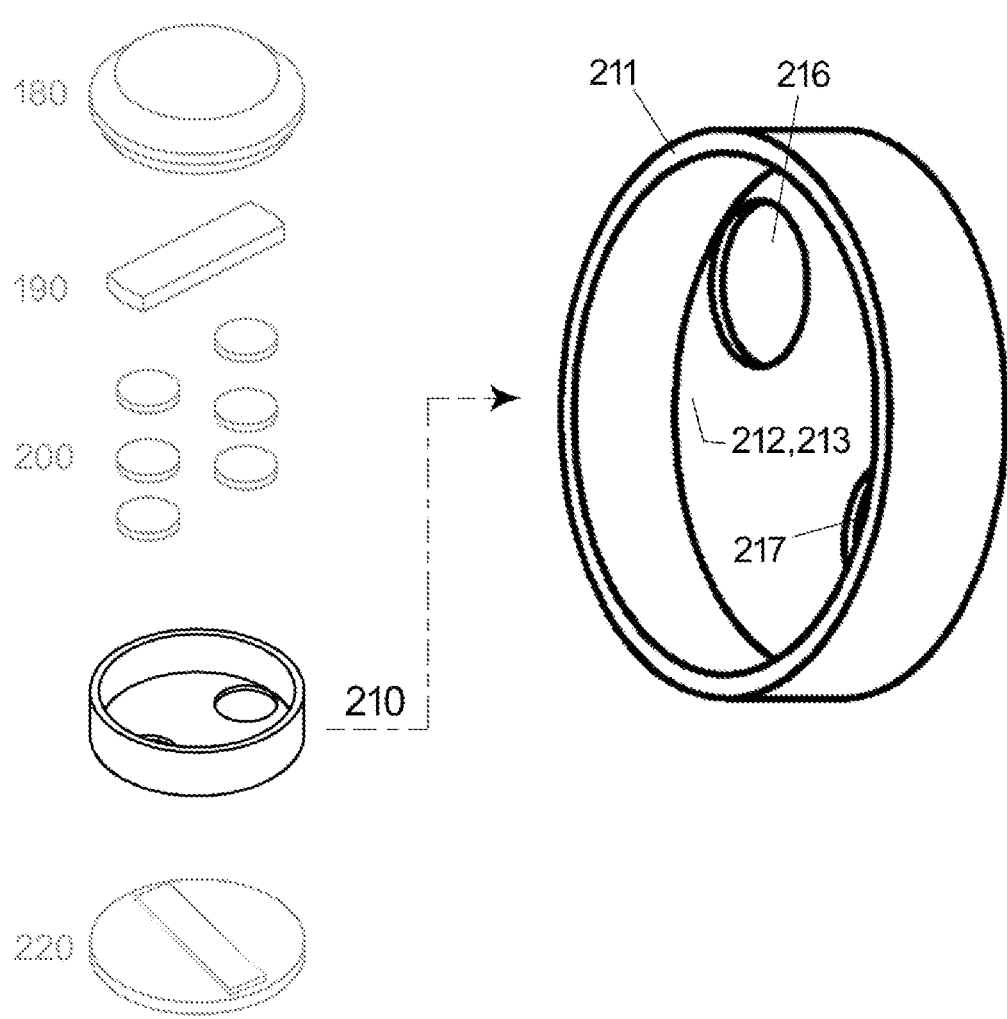

FIG. 20 illustrates the internal magnets housing, serving as the fourth primary component of the internal disk subassembly; shown is a perspective view of the internal magnets housing, accompanied by descriptive key numbers that identify the locations of various subcomponents, namely: the internal magnets housing cylinder, internal magnets housing base, internal magnets housing base inner surface, internal magnets housing base outer surface, internal magnets housing rectangular recess, first internal magnet housing pocket, and second internal magnet housing pocket; the internal magnets housing rectangular recess located on the internal magnets housing base outer surface (not visible in this drawing) is configured to slideably fit inside the scraper drive bar; in accordance with an exemplary embodiment of the present invention.

Figure 21:
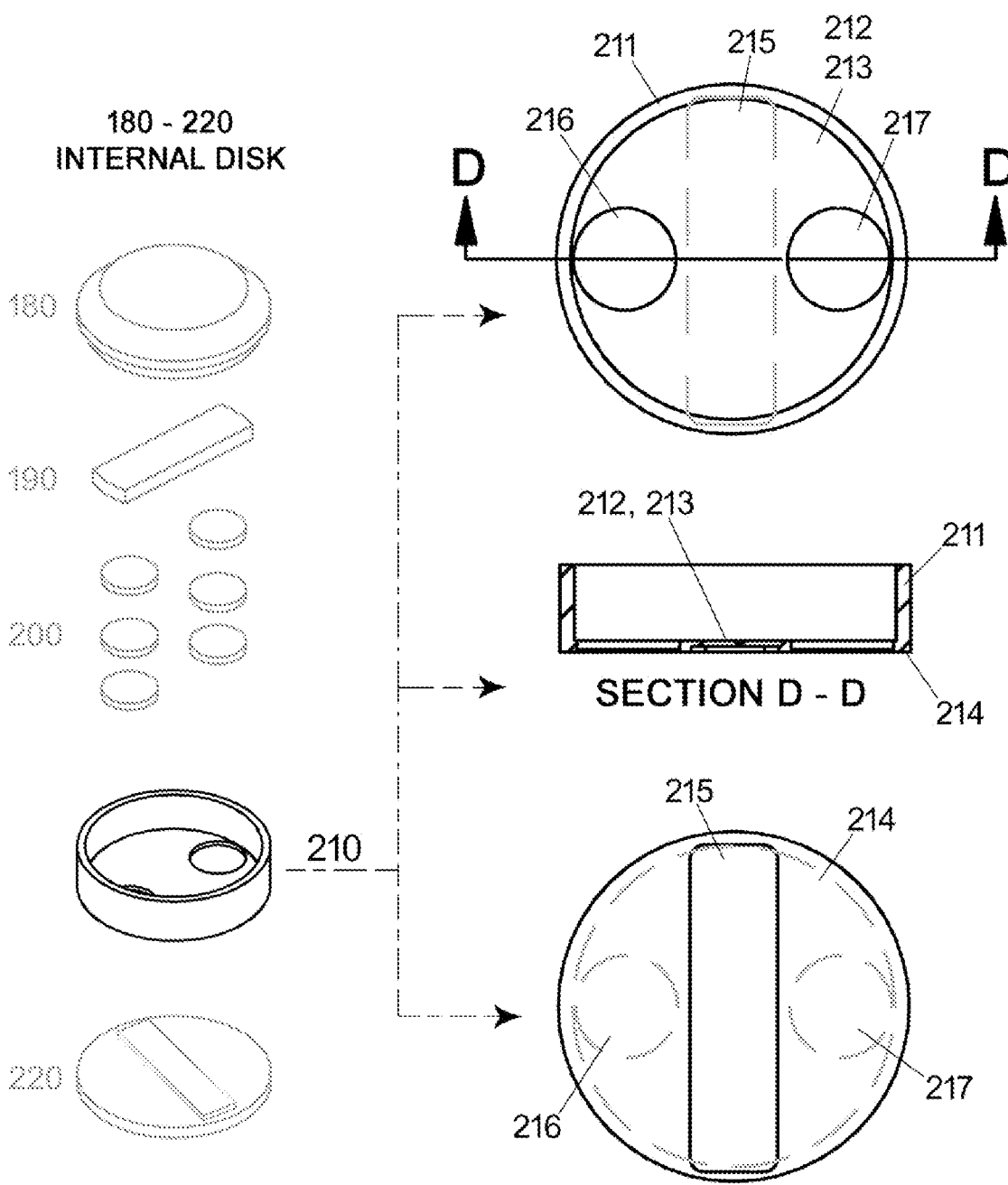

FIG. 21 shows the internal magnets housing, serving as the fourth primary component of the internal disk subassembly; three figures are provided consisting of a top view of the internal magnets housing, showing the locations of the first and second internal magnets housing pockets, as well as the D-D section; a section D-D view, situated in the middle, intended to demonstrate the thickness of the housing's cylinder and its base; a bottom view of the internal magnets housing, designed to reveal the outer surface of the internal magnets housing base with its rectangular recess; the internal magnets housing rectangular recess is configured to slideably fit in the scraper drive bar, enabling transfer of the rotation from the internal strut to the internal magnets housing; in accordance with an exemplary embodiment of the present invention.

Figure 22:
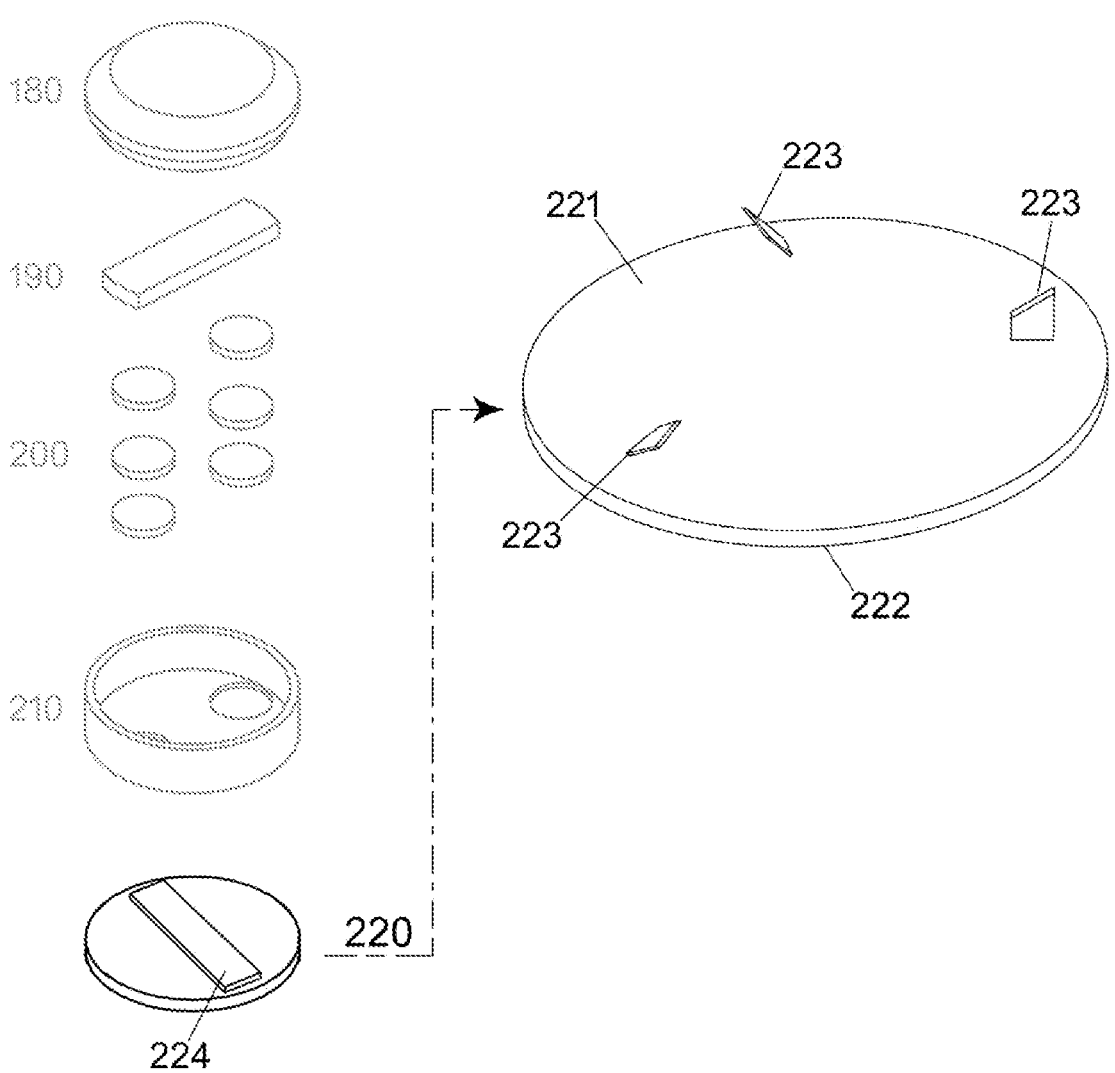

FIG. 22 illustrates the scraper, functioning as the fifth primary component of the internal disk subassembly; the figure presents a single perspective view of the scraper, intended to delineate the location of the scraper blades and other components, identified using descriptive key numbers; in accordance with an exemplary embodiment of the present invention.

Figure 23:
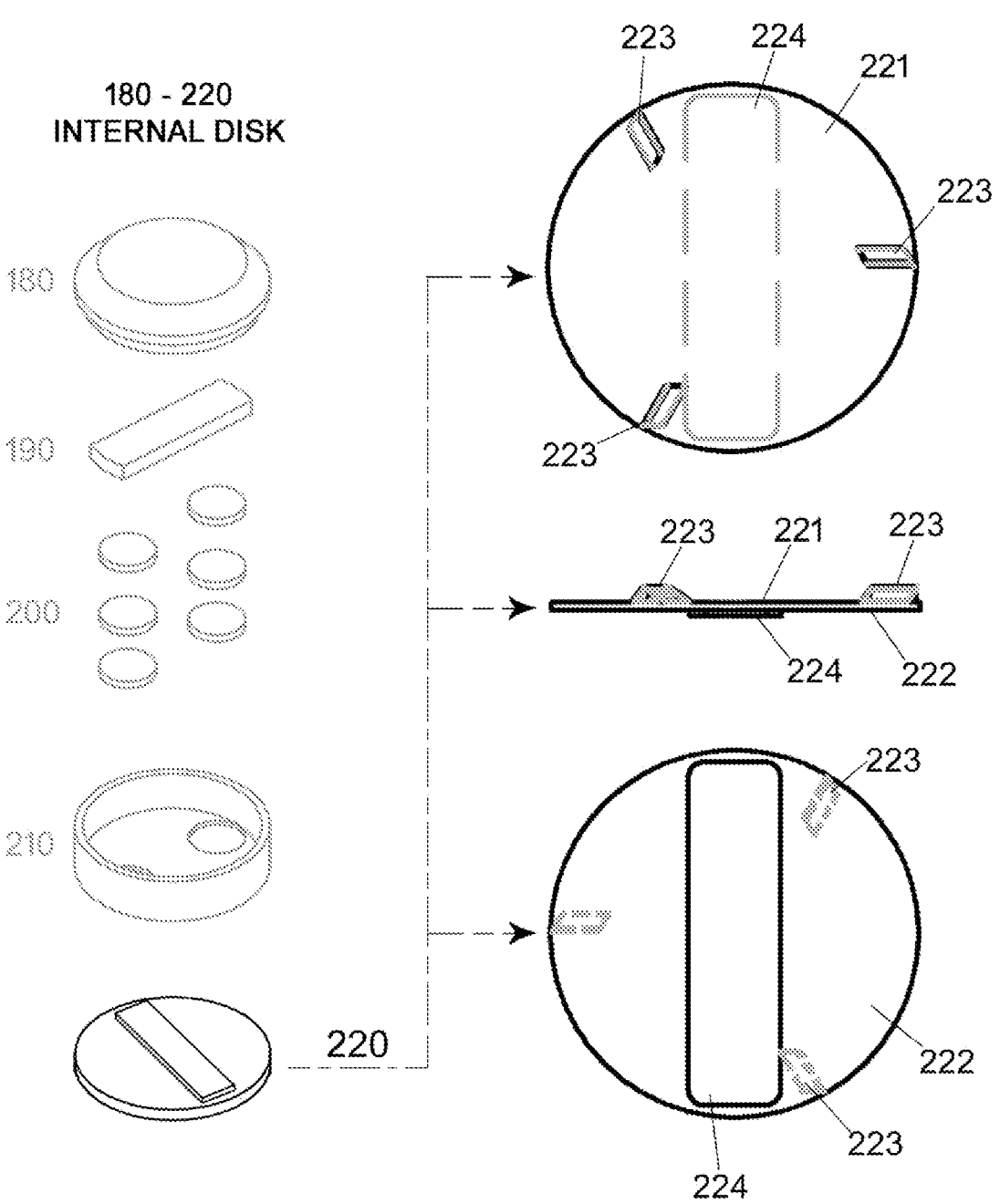

FIG. 23 shows the scraper, serving as the fifth primary component of the internal disk subassembly; the figure offers three views: first, a top view of the scraper; middle, a side view of the scraper; and a bottom view of the scraper, designed to show the location of the scraper bar configured to fit inside of it the rectangular recess of the internal magnets housing; this configuration enables the transfer of rotation from the internal magnets housing to the scraper, facilitating the rotation of the scraper blades about the internal surface of the aquarium glass; in accordance with an exemplary embodiment of the present invention.

Figure 24:
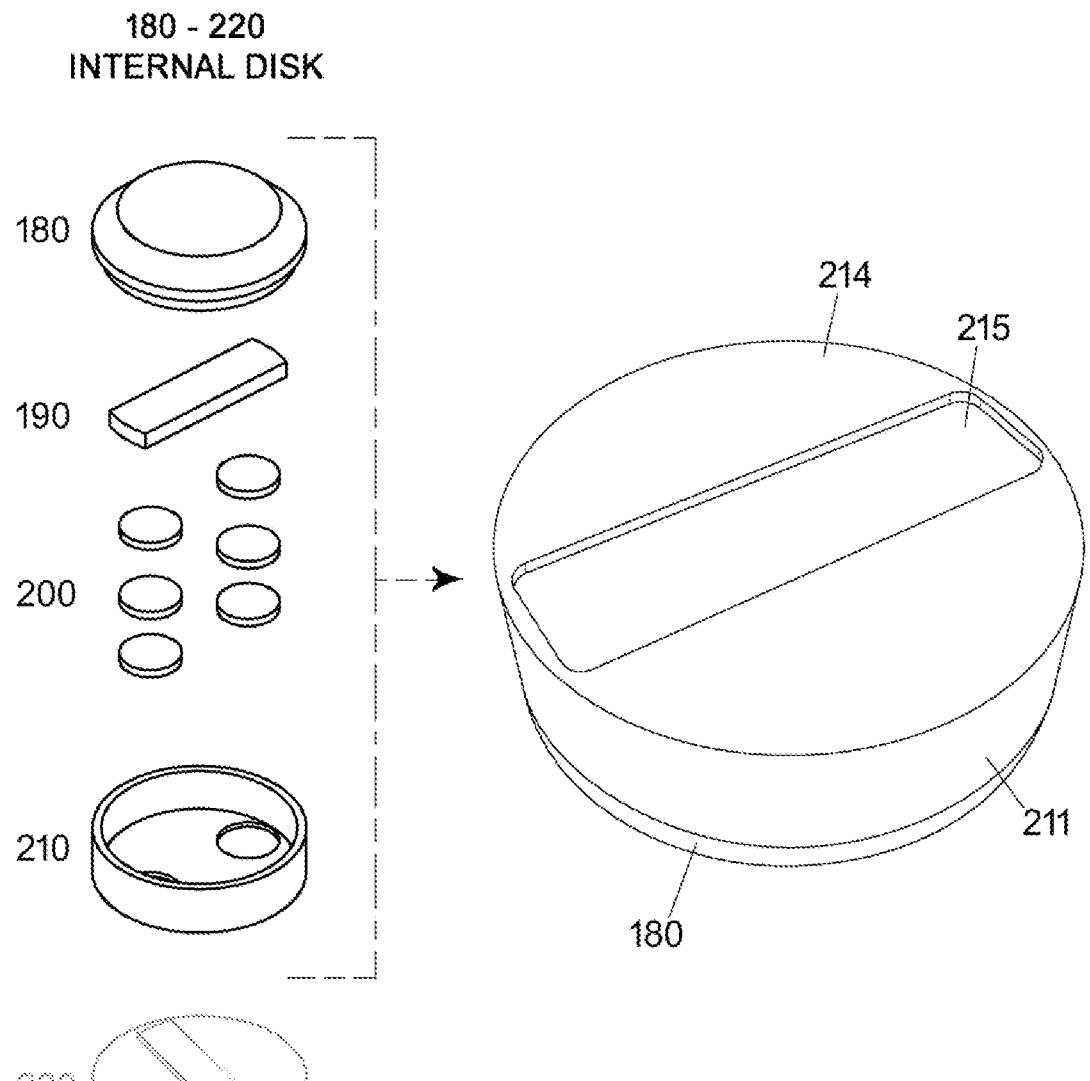

FIG. 24 displays the internal disk subassembly, with the exception of the scraper; the figure offers a perspective view of the subassembly, revealing the outer surface of the internal magnets housing base containing the rectangular recess for housing therein the scraper drive bar; this arrangement facilitates the transfer of rotation from the internal magnets housing to the scraper, enabling the rotational movement of the scraper blades along the internal surface of an aquarium glass; in accordance with an exemplary embodiment of the present invention.

Figure 25:
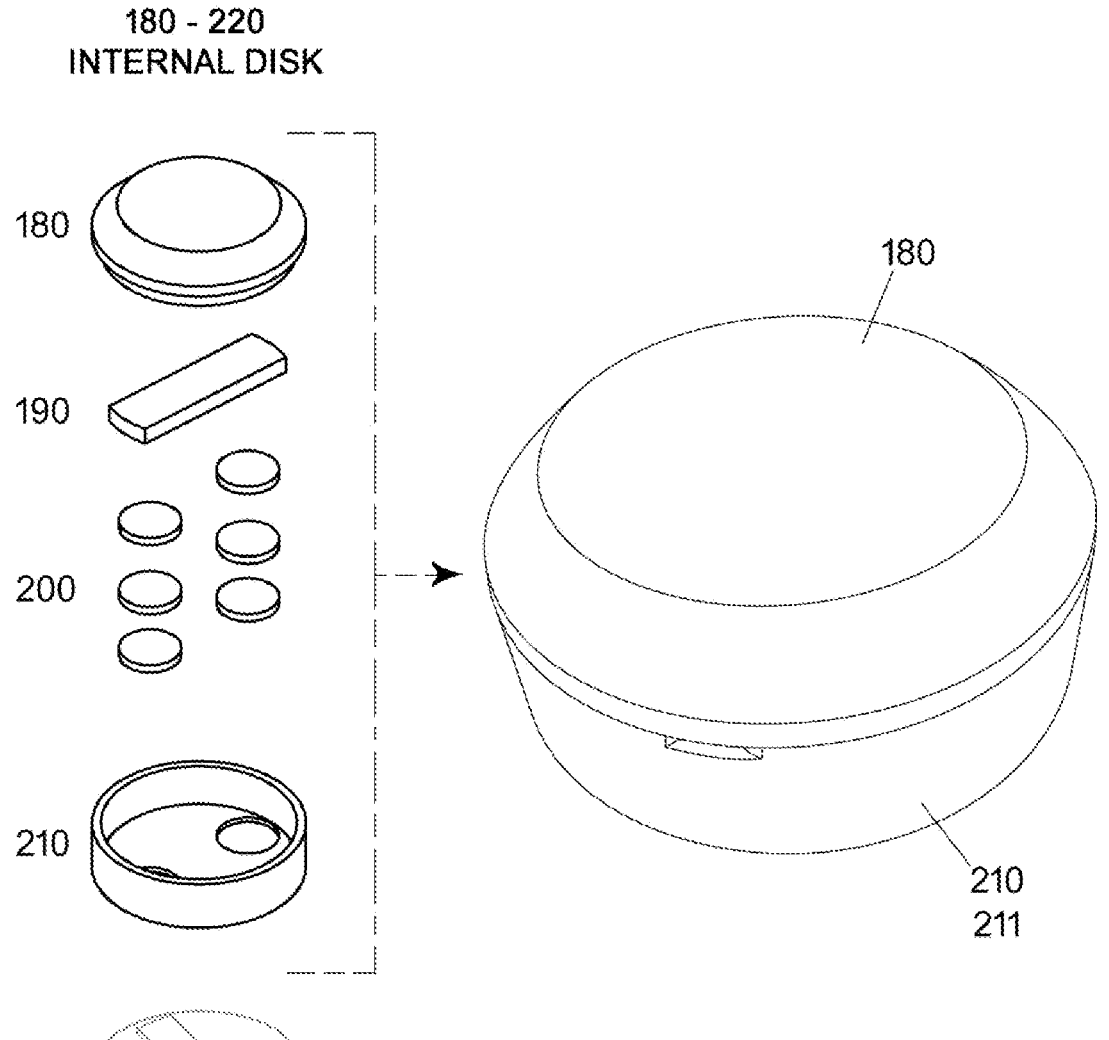

FIG. 25 illustrates the internal disk subassembly, omitting the scraper; the figure presents a single perspective view of the subassembly comprising of the cover and attached thereto the internal magnets housings; in accordance with an exemplary embodiment of the present invention.

DESCRIPTIVE KEY

100—Automated magnetic rotary aquarium glass scraper and scratch remover ("scraper")
110-170 External Disk Sub-Assembly
   110—swivel housing
      111—ball joint retaining ring
      112—plurality of clearance holes
      113—plurality of screws
      114—swivel housing base
   120—O-ring
   130—swivel
      131—swivel ball joint
      132—swivel shaft (hexagonal-shaped)
   140—lid
      141—lid top surface
      142—lid bottom surface
      143—plurality of threaded holes
      144—lid groove
   150—external strut
   160—plurality of external magnets
      161—external first stack of magnets
      162—external second stack of magnets
   170—external magnets housing 171—external magnet housing cylinder (wall)
172—external magnet housing base
173—external magnet housing base inner surface
174—external magnet housing base outer surface
175—first external magnet housing pocket
176—second external magnet housing pocket
180-220 Internal Disk Sub-Assembly
   180—cover
      181—cover cavity
   190—internal strut
   200—plurality of internal magnets
      201—internal first stack of magnets
      202—internal second stack of magnets
   210—internal magnets housing
      211—internal magnet housing cylinder
      212—internal magnet housing base
      213—internal magnet housing base inner surface
      214—internal magnet housing base outer surface
      215—internal magnet housing rectangular recess
      216—first internal magnet housing pocket
      217—second internal magnet housing pocket
   220—scraper
      221—scraper top surface
      222—scraper bottom surface
      223—scraper blades
      224—scraper drive bar
   300—automatic rotational apparatus (e.g., power drill)

DETAILED DESCRIPTION OF THE PREFERRED EMBODIMENT

Figure 1:
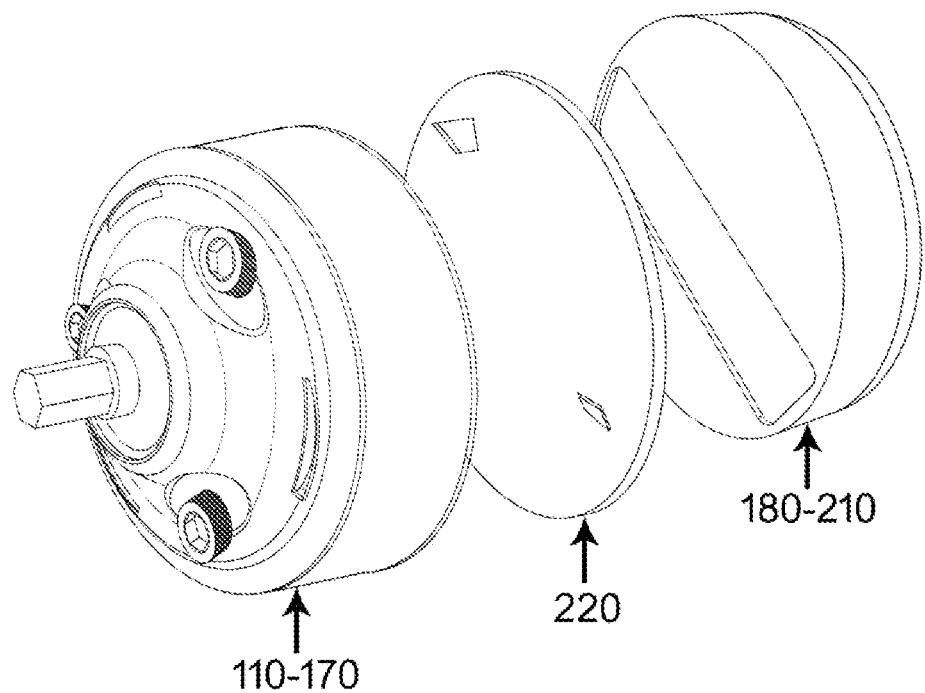
FIG. 1 shows a perspective view of the present invention titled Automated Magnetic Rotary Aquarium Glass Scraper and Scratch Remover ("scraper") the figure illustrates two subassemblies of the scraper: (1) external disk subassembly (used on the external, or the dry side of the aquarium glass), which includes: swivel housing, O-ring, swivel, lid, external strut, external magnets, and external magnets housing; and (2) internal disk subassembly (used on the internal, or the water side of the aquarium glass), consisting of: cover, internal strut, internal magnets, internal magnets housing, and a scraper; in accordance with an exemplary embodiment of the present invention.

The following description references to the above-defined drawings and represents only an exemplary embodiment of the invention. It is foreseeable, and recognizable by those skilled in the art, that various modifications and/or substitutions to the invention could be implemented without departing from the scope and the character of the invention:

As shown in FIG. 1, the present invention introduces an automated, magnetic rotary aquarium glass scraper and scratch remover ("scraper") 100. This innovative device is engineered to efficiently eliminate algae buildup and debris from the interior surface of aquarium glass, while also addressing scratches on the glass surface.

Figure 4:
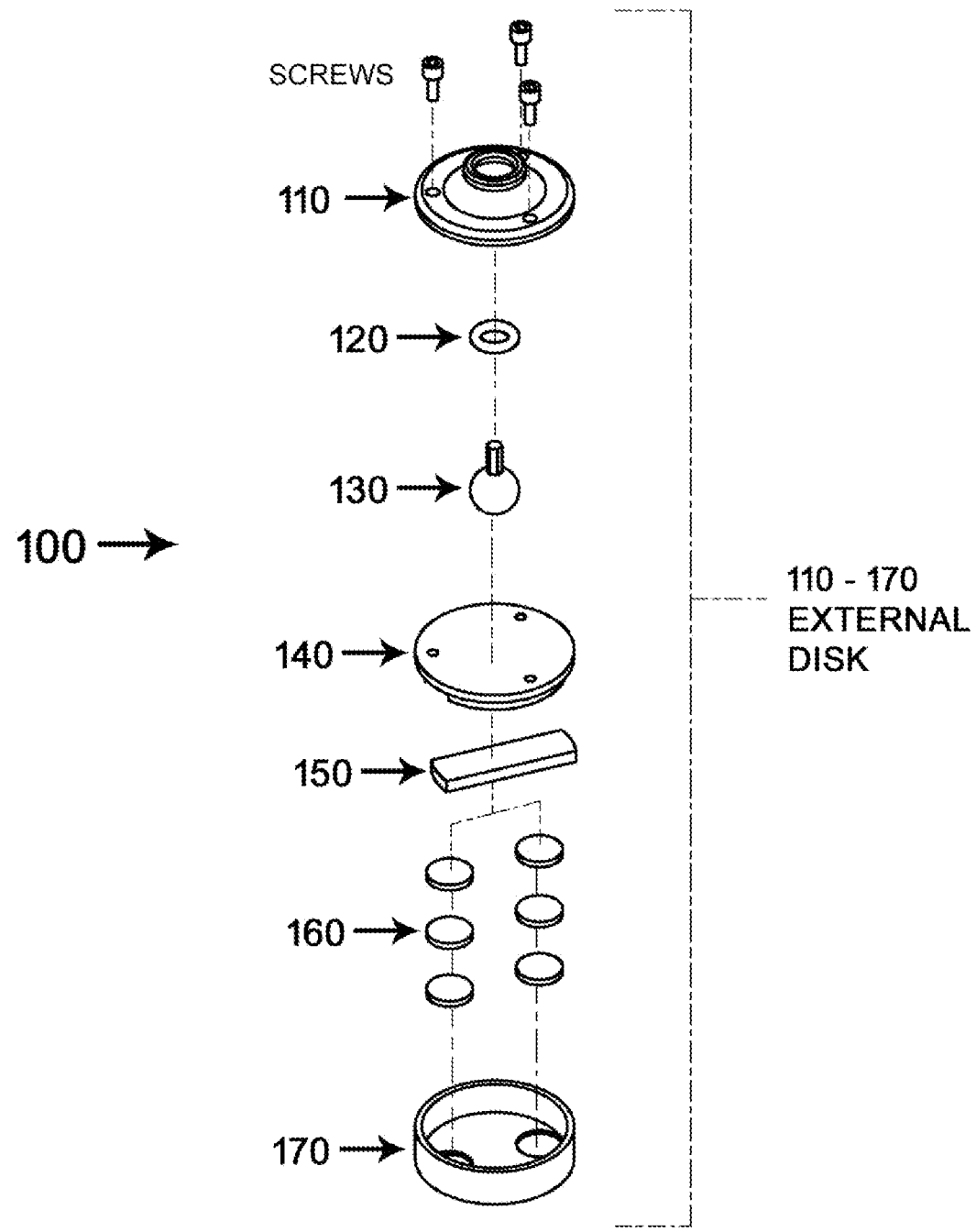
FIG. 4 shows an exploded view of the external disk subassembly; the figure delineates the seven key components comprising this assembly, which include the swivel housing, O-ring, swivel, lid, external strut, a plurality of external magnets, and external magnet housing; in accordance with an exemplary embodiment of the present invention.

The scraper 100 comprises two main subassemblies: the external disc subassembly 110-170, shown in FIG. 4, and the internal disc subassembly 180-220, shown in FIG. 16. The external disc subassembly 110-170 consists of seven key components, including the swivel housing 110, O-ring 120, swivel 130, lid 140, external strut 150, a plurality of external magnets 160, and the external magnet housing 170.

Figure 5:
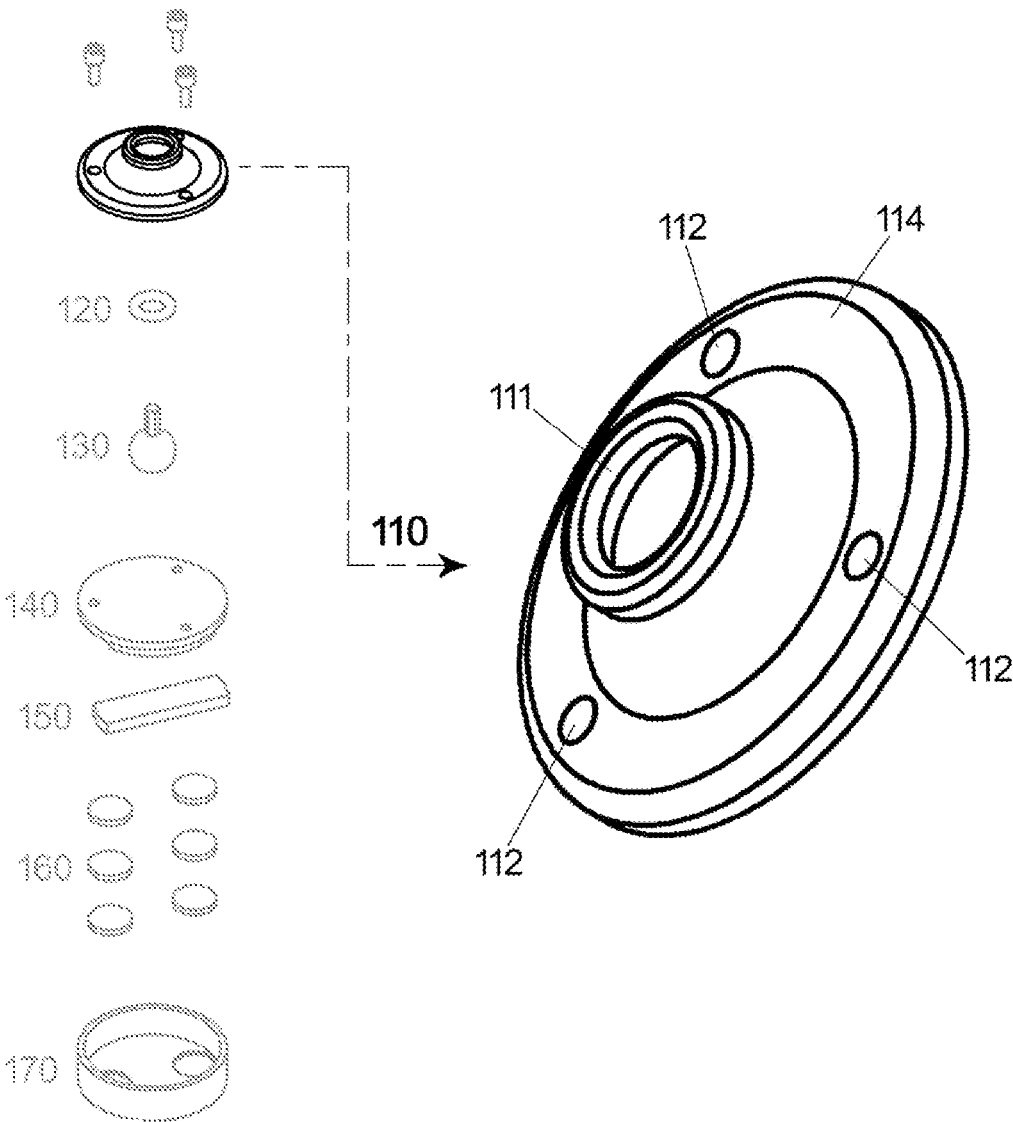
FIG. 5 shows a perspective view of the first primary component of the external disk subassembly, namely, the round-shaped swivel housing; here, using a descriptive key, the figure illustrates the placement of various components the swivel housing, including the ball joint retaining ring, a plurality of clearance holes, a plurality of screws, and the swivel housing base; in accordance with an exemplary embodiment of the present invention.
Figure 6:
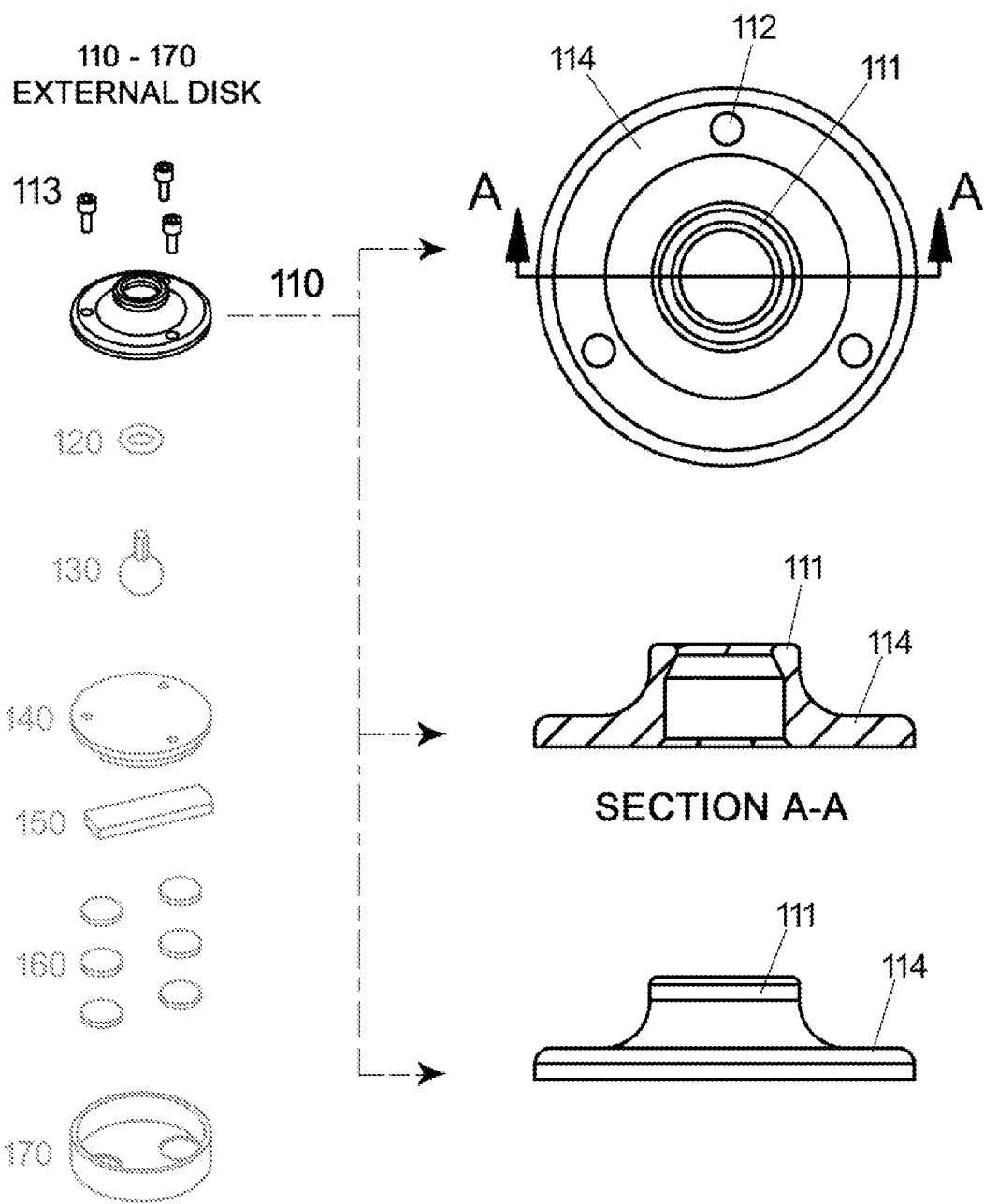
FIG. 6 depicts three views of the round-shaped swivel housing, serving as the initial primary component of the external disk subassembly; wherein the top figure is a perspective view of the swivel housing designed to show the location of the A-A section view; the middle figure is the section A-A view of the swivel housing; and the bottom figure presents a side view of the swivel housing; the three figures, using the descriptive key, show the location of various components within the housing, including the ball joint retaining ring, a plurality of clearance holes, a plurality of screws, and the swivel housing base; in accordance with an exemplary embodiment of the present invention.
Figure 7:
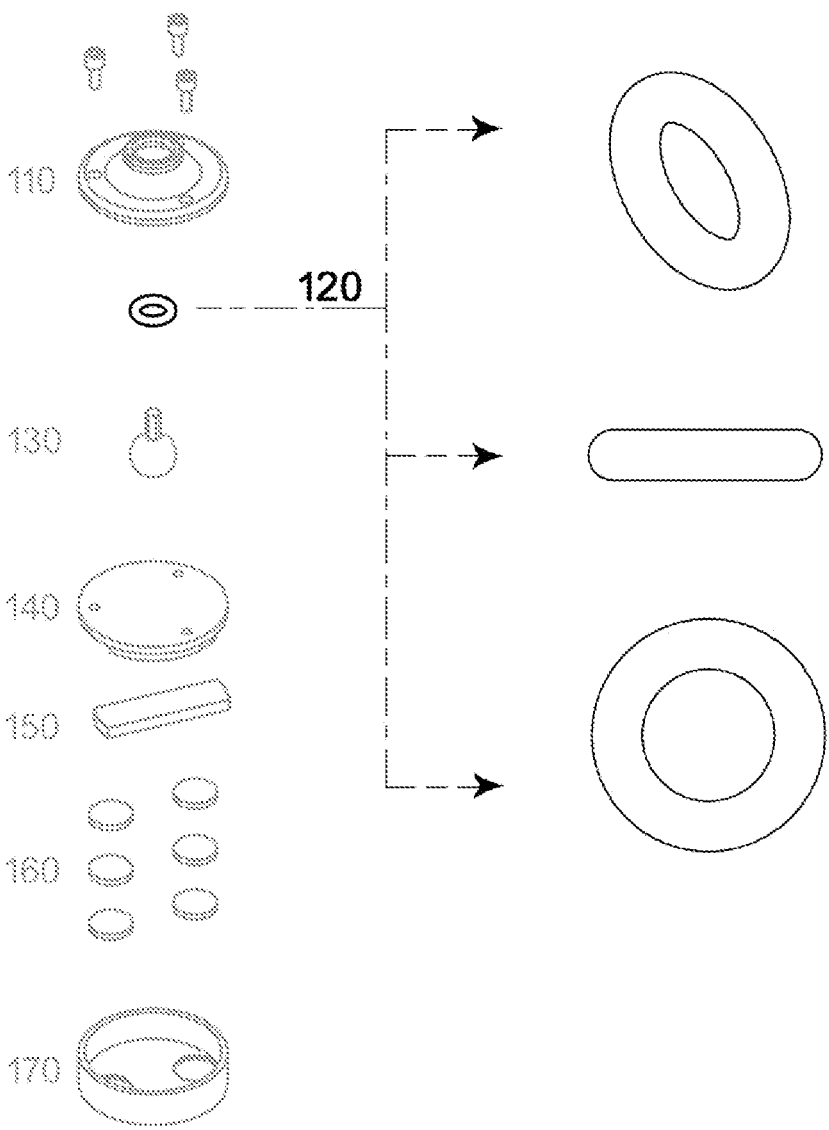
FIG. 7 comprises a perspective view, a side view, and a top view of the O-ring, designated as the second primary component of the external disk subassembly, which upon assembly is sandwiched between the swivel and the swivel housing; in accordance with an exemplary embodiment of the present invention.
Figure 8:
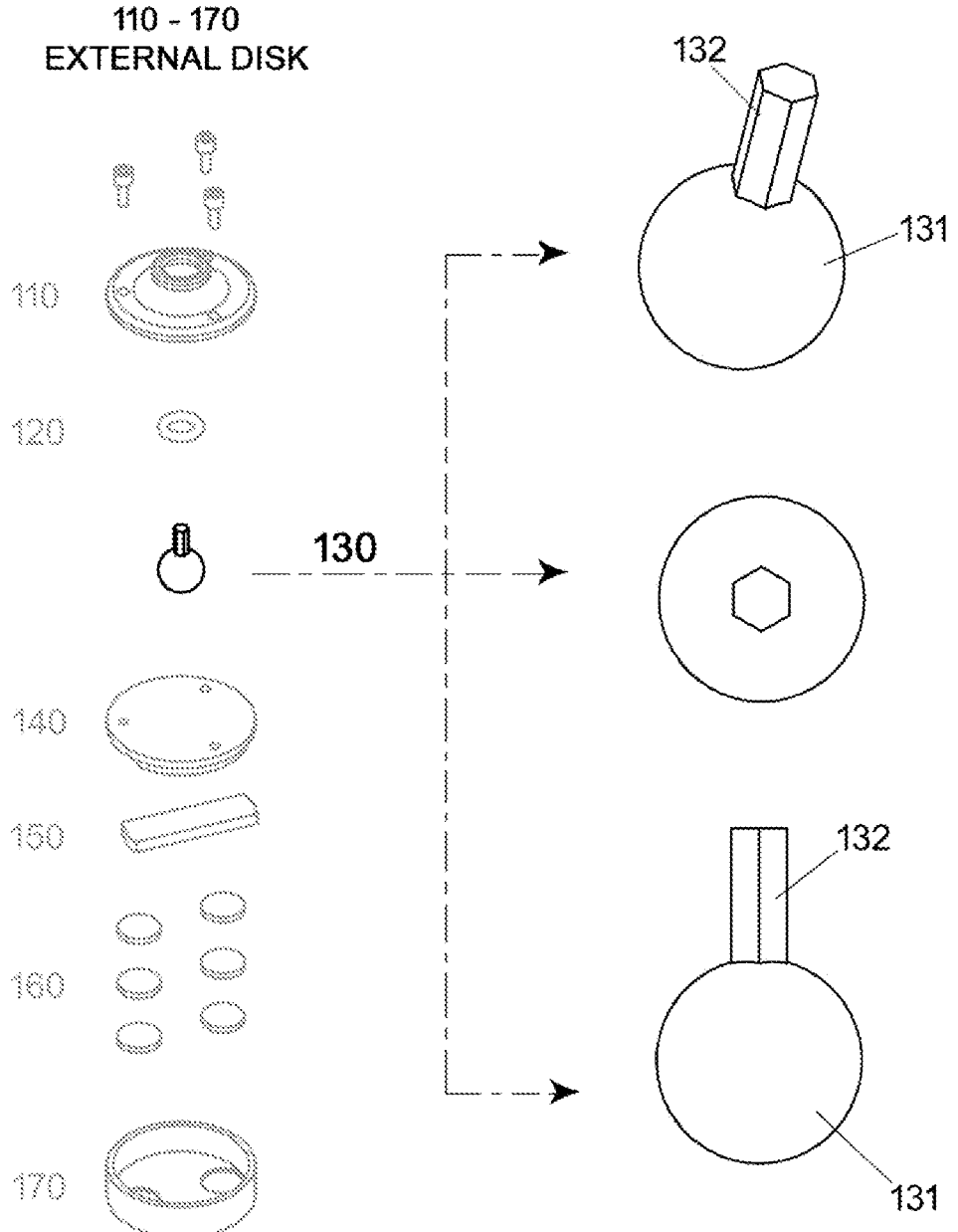
FIG. 8 exhibits three views of the swivel, serving as the third primary component of the external disk subassembly; wherein the figure positioned at the top of the page presents a perspective view of the swivel; while the middle figure offers a top view of the swivel; and the bottom figure provides a side view of the swivel; in addition, the descriptive key numbers are used to clearly delineate the locations of the swivel ball joint, and swivel shaft, which features a hexagonal shape to prevent slippage within the chuck of the power drill providing the rotation power to the external disk assembly; in accordance with an exemplary embodiment of the present invention.

To employ the external disc subassembly 110-170, the user initially places the O-ring 120 (shown in FIG. 7) inside the swivel housing 110 (shown in FIGS. 5-6), ensuring it is securely positioned near the ball joint retaining ring 111 of the swivel housing 110. Subsequently, the user inserts the swivel 130 into this housing 110, confirming proper placement when the swivel shaft 132 protrudes through the ball joint retaining ring 111 (shown in FIG. 14), and the swivel ball joint 131 is held in place by the ball joint retaining ring 111, yet allowing the swivel 130 to pivot in any direction.

Figure 9:
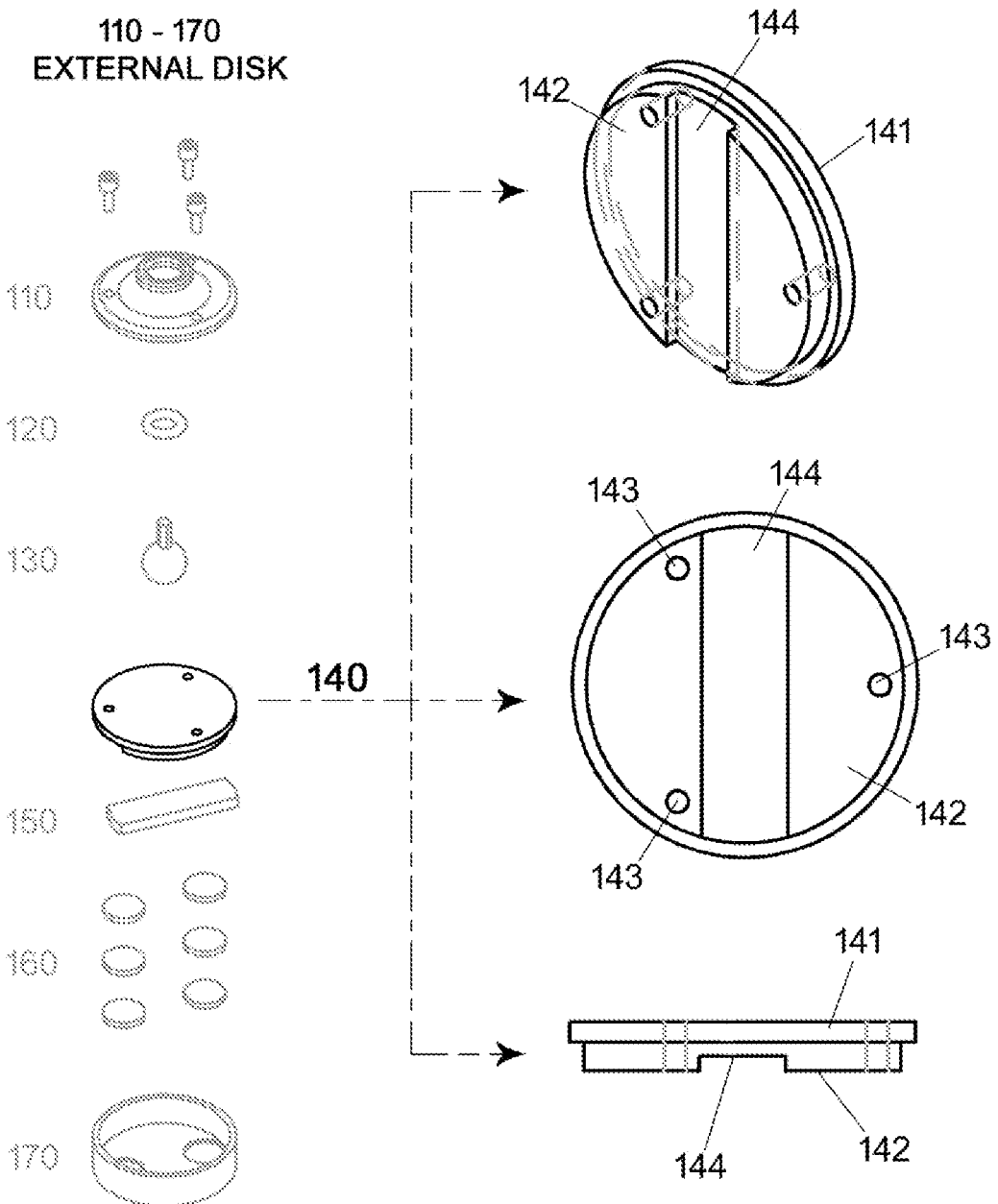
FIG. 9 presents three views of the lid, designated as the fourth primary component of the external disk subassembly, which upon assembly, is positioned between the swivel housing and the external magnets housing; wherein the top view offers a perspective view of the lid, highlighting its design with a lid groove located on the lid bottom surface.

Next, the lid (shown in FIG. 9) of the external disc subassembly 110-170 is affixed to the swivel housing 110 using a plurality of screws 113 (machine screws or similar). The screws 113 are inserted through the clearance holes 112 located on the swivel housing base 114, and are threaded into corresponding plurality of threaded holes 143 disposed on the lid 140. Once this step is completed, the swivel housing 110 is firmly attached to the lid top surface 141. The lid bottom surface 142, perpendicularly located to the lid top surface 141, features a lid groove 144 which extends along the entire radius of the lid 140, as shown in FIG. 9.

The subsequent step in assembling the external disc subassembly 110-170 involves arranging the external strut (shown in FIG. 10) 150 with the plurality of external magnets (shown in FIG. 11) 160 and placement of these components into the external magnets housing 170 (shown in FIG. 12).

The external magnets housing 170 further consists of an external magnets housing cylinder 171 enclosing the external magnet housing base 172. The meeting of these two components forms what visually can be described as a cylindrically-shaped container. The external magnet housing base 172 further comprises the external magnets housing base inner surface 173 and the external magnets housing base outer surface 174.

The external magnets housing base inner surface 173 contains two round recesses identified as the first external magnet housing pocket 175 and the second external magnet housing pocket 176, shown in FIG. 12. The plurality of external magnets 160, subdivided into the external first stack of magnets 161, and the external second stack of magnets 162, are placed inside of these pockets. In this example, the external first stack of magnets 161, comprising three magnets, is placed inside the first external magnet housing pocket 175, while the external second stack of magnets 162, also comprising three magnets, is placed inside the second external magnet housing pocket 176, as shown in FIGS. 13 and 15. Once the plurality of external magnets 160 are situated within the external magnets housing 170, the external strut (rectangular-shaped) 150 is positioned atop these magnets 160, as shown in FIG. 15).

The external strut 150 serves to link the plurality of external magnets 160 and prevents their movement within the external magnets housing 170. Once the magnets 160 and external strut 150 are in place, the lid 140, and the swivel housing 110 bolted to it, are combined with the external magnets housing 170 by taking advantage of tightly fitting components, resulting in a firm, but releasable connection. During this connection process, the lid groove 144 situated on the lid bottom surface 142, of the lid 140, aligns with the external strut 150, allowing the strut 150 to slidably fit inside the lid groove 144 (reference FIG. 13). The connection of these components finishes the construction of the external disc subassembly 110-170.

To assemble the internal disc subassembly 180-220, the user must gather its five primary components: the cover 180, internal strut 190, a plurality of internal magnets 200, an internal magnet housing 210, and a scraper 200, as shown in FIG. 16. The internal magnet housing 210 (shown in FIGS. 20-21) consists of several parts, including the internal magnets housing cylinder 211, internal magnets housing base 212, internal magnets housing base inner surface 213, internal magnets housing base outer surface 214, internal magnets housing rectangular recess 215, first internal magnets housing pocket 216, and second internal magnets housing pocket 217.

Similar to the external disc subassembly 110-170, the internal magnet housing 210 is first outfitted with the plurality of internal magnets 200. The plurality of internal magnets 200, comprising the internal first stack of magnets 201 and the internal second stack of magnets 202 (shown in FIG. 19), are assembled, with each stack containing three magnets. The internal first stack of magnets 201 is placed inside the first internal magnets housing pocket 216, while the internal second stack of magnets 202 is placed inside the second internal magnets housing pocket 217.

Once the plurality internal magnets 200 are assembled within the internal magnets housing 210, the internal strut 190 is positioned on top of the magnets 200 to activate the magnetic force, preventing any movement of the magnets 200. Next, the cover (shown in FIG. 17), incorporating a cover cavity 181 to reduce its weight, is placed on top of the internal magnets housing 210. Using friction between components to create a firm yet releasable connection, the internal magnets 210 housing is securely capped (shown in FIG. 25) to prevent water or contaminants from entering inside the housing 210.

The scraper 220 (shown in FIGS. 22-23) further comprises the scraper top surface 221, scraper bottom surface 222, and scraper blades 223 which are disposed on the scraper top surface 221. The internal magnets housing base outer surface 214 features an internal magnets housing rectangular recess 215 (shown in FIG. 24) designed to slidably accept the scraper drive bar 224 attached to the scraper bottom surface 222.

Once the two subassemblies are completed, they can be put to practical use. First, the external subassembly 110-170 is placed against the exterior surface of the aquarium glass. Second, on the opposite surface of the glass, therefore the internal surface of the glass where algae and debris buildup takes place, the end user places the scraper 220 with the scraper blades 223 facing the glass, along with the remaining components of the internal subassembly 180-210 attached to it via the magnetic force generated by the plurality of internal magnets 200 on the scraper drive bar 224.

Figure 2:
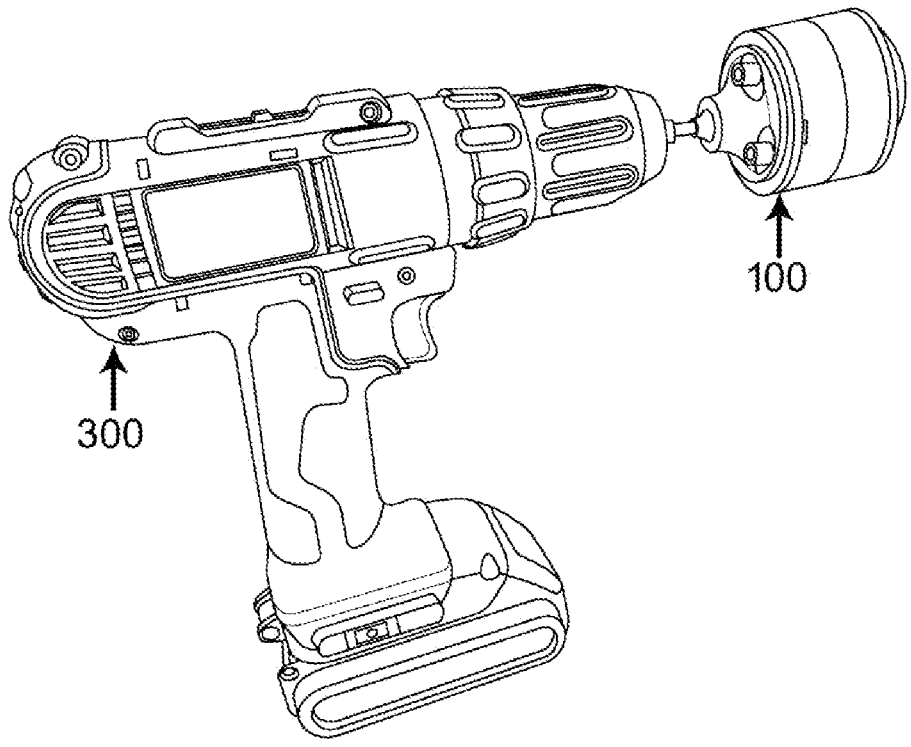
FIG. 2 presents a perspective view of the scraper and an automatic rotational apparatus ("power drill"); specifically, the figure displays the connection between the external disk subassembly and the internal disk subassembly, with the swivel shaft inserted into the chuck of the power drill; this setup enables the rotation of the external disk subassembly, which, in turn, rotates the internal disk subassembly via the magnetic connection; in accordance with an exemplary embodiment of the present invention.
Figure 3:
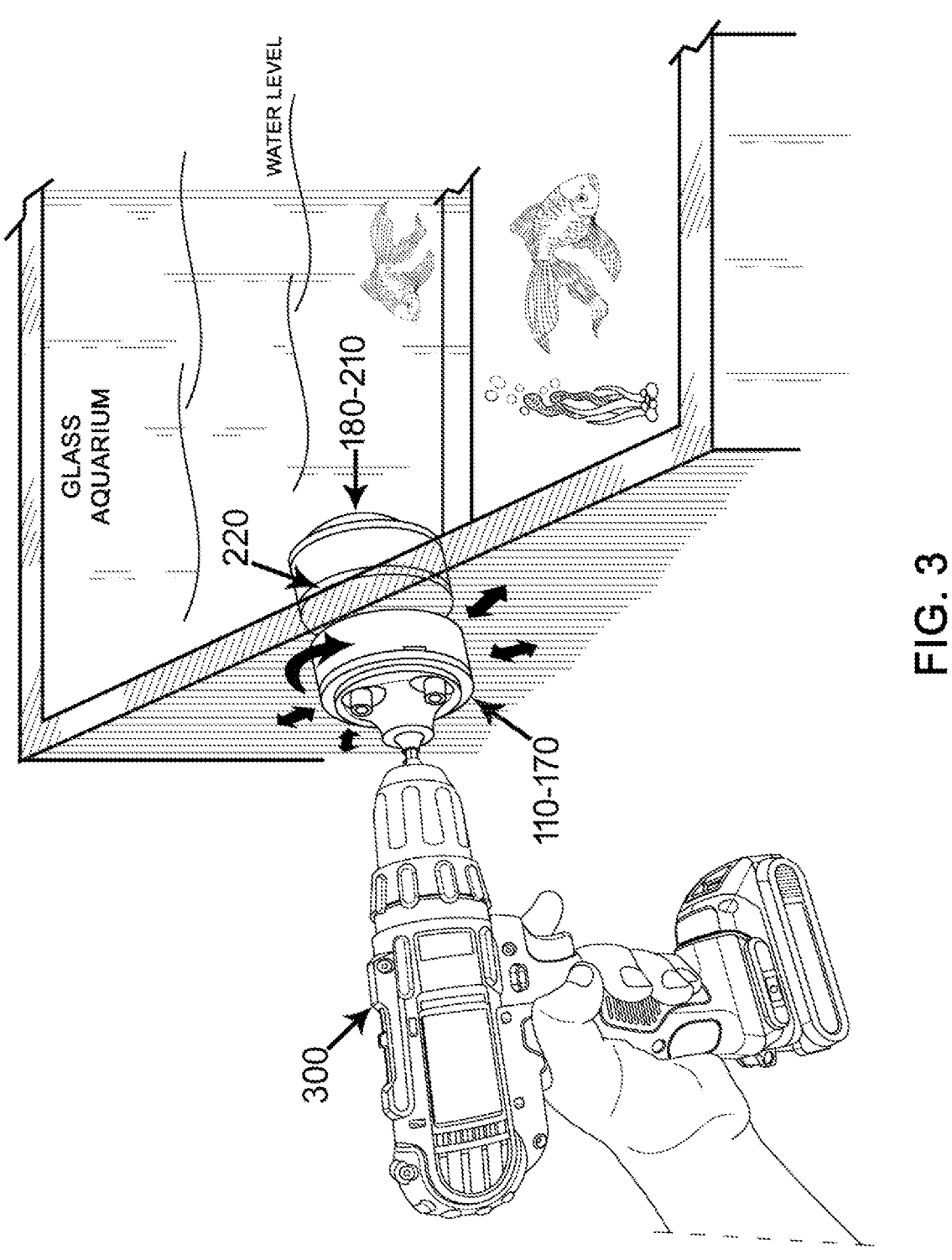
FIG. 3 displays a power drill attached to the external disk subassembly, which is pressed against the external surface of an aquarium glass, alongside the internal disk subassembly, which is pressed against the internal surface of the aquarium glass; the purpose of the figure is to demonstrate that the power drill serves as the driving force for the rotation of the external disk assembly, which, in turn, induces rotation of the internal disk assembly through magnetic force, generated by the plurality of magnets situated inside the external magnets housing and internal magnets housing; the scraper, situated between the external disk subassembly and the internal magnet housing, rotates along with the internal disk assembly, following the movement of the power drill and effectively scraping algae from the internal surface of the aquarium glass; in accordance with an exemplary embodiment of the present invention.

Next, the user will connect an automatic rotational apparatus 300, or a power drill (shown in FIGS. 2-3) to the swivel 130 via the swivel shaft 132. The swivel shaft 132 is hexagonal-shaped to prevent any slippage of the shaft 132 inside of the chuck of the power drill 300.

Once the power drill 300 is activated, it will supply the rotational force through the swivel 130 into the lid 140, and down to the plurality of external magnets 160 (located on the external side of the glass), causing the external magnets housing 170 to rotate. The magnetic force of the plurality of external magnets 160 will cause the plurality of internal magnets 200 (located on the interior side of the glass) to rotate as well, in corresponding direction. This rotation will activate the scraper blades 223 pushing against the exterior surface of the glass, effectively removing the buildup of algae and dirt from the internal surface of the glass.

I claim:

1. An automated magnetic rotary aquarium glass scraper and scratch remover, comprising:
(A) a swivel, having
   (a) a swivel shaft, hexagonal-shaped to prevent slippage when held by an automatic rotational apparatus configured to generate rotational motion, and
   (b) a swivel ball joint configured to provide pivotal movement of the swivel;
(B) a swivel housing, round-shaped, configured to pivotally hold the swivel, having
   (a) a ball joint retaining ring, configured to retain the swivel ball joint within the swivel housing, and
   (b) a swivel housing base;
(C) a lid, round-shaped, having
   (a) a lid top surface,
   (b) a lid bottom surface, and
   (c) a lid groove disposed on the lid bottom surface, configured to extend across entire circumference of the lid bottom surface;

(D) an external strut, rectangular-shaped, configured to releasably fit inside the lid groove;
(E) a plurality of external magnets, each disc-shaped, forming
   (a) an external first stack of magnets, and
   (b) an external second stack of magnets;
(F) an external magnets housing, cylindrically-shaped, having
   (a) an external magnets housing cylinder,
   (b) an external magnets housing base,
   (c) an external magnets housing base inner surface,
   (d) an external magnets housing base outer surface,
   (e) a first external magnets housing pocket, disposed on the external magnets housing base inner surface, configured to house the external first stack of magnets; and
   (f) a second external magnets housing pocket, disposed on the external magnets housing base inner surface, configured to house the external second stack of magnets;
(G) wherein said external strut is configured to be positioned atop the plurality of external magnets disposed inside the external magnets housing creating magnetic connection between the plurality of external magnets thereby preventing movement thereof;
(H) wherein the swivel housing holding the swivel is mounted to the lid, and the lid is configured to fit tightly into the external magnets housing securing firm releasable connection thereof, and thereby forming an external disc subassembly;
(I) a cover, round-shaped, having a cover cavity configured to reduce weight of the cover;
(J) an internal strut, rectangular-shaped;
(K) a plurality of internal magnets, each disc-shaped, forming
   (a) an internal first stack of magnets, and
   (b) an internal second stack of magnets;
(L) an internal magnets housing, cylindrically-shaped, having
   (a) an internal magnets housing cylinder,
   (b) an internal magnets housing base,
   (c) an internal magnets housing base inner surface,
   (d) an internal magnets housing base outer surface,
   (e) an internal magnets housing rectangular recess,
   (f) a first internal magnets housing pocket, disposed on the internal magnets housing base inner surface, configured to house the internal first stack of magnets, and
   (g) a second internal magnets housing pocket, disposed on the internal magnets housing base inner surface, configured to house the internal second stack of magnets;
(M) a scraper, round-shaped, having
   (a) a scraper top surface,
   (b) a scraper bottom surface,
   (c) a scraper blades, disposed on the scraper top surface,
   (d) a scraper drive bar, disposed on the scraper bottom surface, and configured to slidably fit inside of the internal magnets housing rectangular recess;
(N) wherein said internal strut is configured to be positioned atop the plurality of internal magnets disposed inside the internal magnets housing creating magnetic connection between the plurality of internal magnets thereby preventing movement thereof;

(O) wherein the cover is configured to fit tightly into the internal magnets housing securing firm releasable connection thereof, and thereby forming an internal disc subassembly;

(P) wherein the external disc subassembly is placed against an exterior glass surface of an aquarium, and the internal disc subassembly with is placed against an interior glass surface of the aquarium with the scraper blades urging upon the interior glass surface;

(Q) wherein the automatic rotational apparatus is configured to cause rotation of the external disc subassembly; and (R) wherein the external disc subassembly is configured to cause corresponding rotation of the internal disc subassembly thereby causing the scraper blades to rotationally scrape the interior glass surface;

whereby the scraper blades rotationally scraping the interior glass surface of the aquarium cause removal of algae buildup and elimination of scratches present on the interior glass surface.

2. The automated magnetic rotary aquarium glass scraper and scratch remover of claim 1, further comprising: an O-ring, configured to provide tight seal between the swivel and the swivel housing.

3. The automated magnetic rotary aquarium glass scraper and scratch remover of claim 1, wherein: said swivel housing further comprises of a plurality of clearance holes and a plurality of screws.

4. The automated magnetic rotary aquarium glass scraper and scratch remover of claim 1, wherein: said lid top surface further comprises of a plurality of threaded holes.

5. The automated magnetic rotary aquarium glass scraper and scratch remover of claim 4, wherein: said lid top surface is fixedly mounted to the swivel housing using a plurality of screws inserted through a plurality of clearance holes and into the plurality of threaded holes.

6. The automated magnetic rotary aquarium glass scraper and scratch remover of claim 1, wherein: the external first stack of magnets is consisting of three the plurality of external magnets, and the external second stack of magnets is also consisting of three the plurality of external magnets.

7. The automated magnetic rotary aquarium glass scraper and scratch remover of claim 1, wherein: the automatic rotational apparatus is causing rotation of the external disc subassembly by rotating the swivel that is pivotally sandwiched between the ball joint retaining ring and the lid, resulting in corresponding rotation of the external strut, and connected thereto the plurality of external magnets, and the external magnets housing.

8. The automated magnetic rotary aquarium glass scraper and scratch remover of claim 1, wherein: the external disc subassembly is configured to cause corresponding rotation of the internal disc subassembly by using magnetic attraction between the plurality of external magnets and the plurality of internal magnets.

* * * * *